(12) United States Patent
Bristow

(10) Patent No.: US 11,531,113 B1
(45) Date of Patent: Dec. 20, 2022

(54) SYSTEM AND METHODS FOR OBJECT DETECTION AND TRACKING USING A LIDAR OBSERVATION MODEL

(71) Applicant: Aurora Innovation, Inc., Palo Alto, CA (US)

(72) Inventor: Hilton Bristow, Pittsburgh, PA (US)

(73) Assignee: AURORA OPERATIONS, INC., Mountain View, CA (US)

(*) Notice: Subject to any disclaimer, the term of this patent is extended or adjusted under 35 U.S.C. 154(b) by 327 days.

(21) Appl. No.: 16/800,919

(22) Filed: Feb. 25, 2020

(51) Int. Cl.
| | |
|---|---|
| *G01S 17/931* | (2020.01) |
| *G01S 17/42* | (2006.01) |
| *G01S 17/89* | (2020.01) |
| *B60R 11/04* | (2006.01) |
| *G06V 20/58* | (2022.01) |

(52) U.S. Cl.
CPC ............ *G01S 17/931* (2020.01); *B60R 11/04* (2013.01); *G01S 17/42* (2013.01); *G01S 17/89* (2013.01); *G06V 20/58* (2022.01); *B60R 2300/301* (2013.01); *B60R 2300/8093* (2013.01)

(58) Field of Classification Search
CPC ........ G01S 17/931; G01S 17/42; G01S 17/89; G06V 20/58; B60R 11/04; B60R 2300/301; B60R 2300/8093
See application file for complete search history.

(56) References Cited

U.S. PATENT DOCUMENTS

| | | | | |
|---|---|---|---|---|
| 8,488,877 B1 * | 7/2013 | Owechko | ............... | G06V 20/64 382/165 |
| 8,620,089 B1 * | 12/2013 | Korah | .................. | G06V 20/176 382/173 |
| 10,509,947 B1 * | 12/2019 | Douillard | ............... | G06V 20/56 |
| 10,663,590 B2 * | 5/2020 | Rzeszutek | ............... | G01S 17/87 |
| 2015/0363940 A1 * | 12/2015 | Held | ........................ | G06T 7/207 382/107 |
| 2017/0115396 A1 * | 4/2017 | Uehara | .................. | G01S 7/4808 |
| 2017/0299697 A1 | 10/2017 | Swanson | | |
| 2017/0369051 A1 * | 12/2017 | Sakai | .................... | G01S 7/4802 |

(Continued)

FOREIGN PATENT DOCUMENTS

| | | | |
|---|---|---|---|
| DE | 102004052347 A1 * | 5/2006 | .......... G01S 13/931 |
| WO | WO-2018/107237 A1 | 6/2018 | |

OTHER PUBLICATIONS

Himmelsbach etal, "Real-time Object Classification in 3D point clouds using point feature histograms", Oct. 2009, IEEE, whole document (Year: 2009).*

*Primary Examiner* — Peter D Nolan
*Assistant Examiner* — Kenneth M Dunne
(74) *Attorney, Agent, or Firm* — Foley & Lardner LLP

(57) ABSTRACT

A system for detecting and tracking objects using lidar can include one or more processors configured to receive lidar data. The one or more processors can determine shape data from the lidar data. The shape data can be indicative of an object. The one or more processors can determine a plurality of extents of the object based on the shape data. The one or more processors can update a state of the object based on the plurality of extents, the state including a boundary of the object. The one or more processors can provide the state of the object to an autonomous vehicle controller to cause the autonomous vehicle controller to control an autonomous vehicle responsive to the state of the object.

19 Claims, 12 Drawing Sheets

(56) References Cited

U.S. PATENT DOCUMENTS

| | | | |
|---|---|---|---|
| 2018/0095465 A1* | 4/2018 | Gao | B62D 15/0265 |
| 2018/0144496 A1* | 5/2018 | Posner | G06V 20/653 |
| 2018/0232947 A1* | 8/2018 | Nehmadi | G01S 7/295 |
| 2018/0307921 A1* | 10/2018 | Vallespi-Gonzalez | G01S 17/931 |
| 2019/0145765 A1* | 5/2019 | Luo | G06V 10/454 702/153 |
| 2019/0310378 A1* | 10/2019 | Ho | G06T 7/187 |
| 2021/0003665 A1* | 1/2021 | Laddha | G01S 7/4808 |

* cited by examiner

SYSTEM AND METHODS FOR OBJECT DETECTION AND TRACKING USING A LIDAR OBSERVATION MODEL

BACKGROUND

The present disclosure relates generally to using light detection and ranging (lidar) to detect and track objects, and more particularly to systems and methods for object detection and tracking using a machine learning model.

One of the challenges to any autonomous vehicle-related technology relates to collecting and interpreting information about a vehicle's surrounding environment, along with planning and executing commands to appropriately control vehicle motion to navigate the vehicle through its current environment. For example, measurement data can be captured from one or more sensors of an autonomous vehicle (or a vehicle equipped with autonomous vehicle sensors) and used for tracking and/or determining dynamic objects within the environment surrounding the vehicle. It can be difficult to detect and track the shapes of objects with sufficient precision and accuracy to enable effective autonomous decision-making in response to the objects.

SUMMARY

Implementations of the present disclosure relate generally to using lidar to detect and track objects, and more particularly to systems and methods for object detection and tracking using a lidar observation model.

At least one aspect of the present disclosure relates to a method for detecting and tracking objects using lidar. The method can include receiving, by one or more processors, lidar data. The method can include determining, by the one or more processors, shape data from the lidar data, the shape data indicative of an object. The method can include determining, by the one or more processors, a plurality of extents of the object based on the shape data. The method can include updating, by the one or more processors, a state of the object based at least in part on the plurality of extents, the state including a boundary of the object. The method can include providing, by the one or more processors, the state of the object to an autonomous vehicle controller to enable the autonomous vehicle controller to control an autonomous vehicle responsive to the state of the object.

At least one aspect of the present disclosure relates to a system for detecting and tracking objects using lidar. The system can include one or more processors configured to receive lidar data. The one or more processors can determine shape data from the lidar data. The shape data can be indicative of an object. The one or more processors can determine a plurality of extents of the object based on the shape data. The one or more processors can update a state of the object based on the plurality of extents, the state including a boundary of the object. The one or more processors can provide the state of the object to an autonomous vehicle controller to cause the autonomous vehicle controller to control an autonomous vehicle responsive to the state of the object.

At least one aspect of the present disclosure relates to a non-transitory computer-readable medium. The non-transitory computer-readable medium can include instructions that when executed by one or more processors, cause the one or more processors to receive lidar data, determine shape data from the lidar data that is indicative of an object, determine a plurality of extents of the object based on the shape data, update a state of the object that includes a boundary of the object based on the plurality of extents, and provide the state of the object to an autonomous vehicle controller to enable the autonomous vehicle controller to control an autonomous vehicle responsive to the state of the object.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
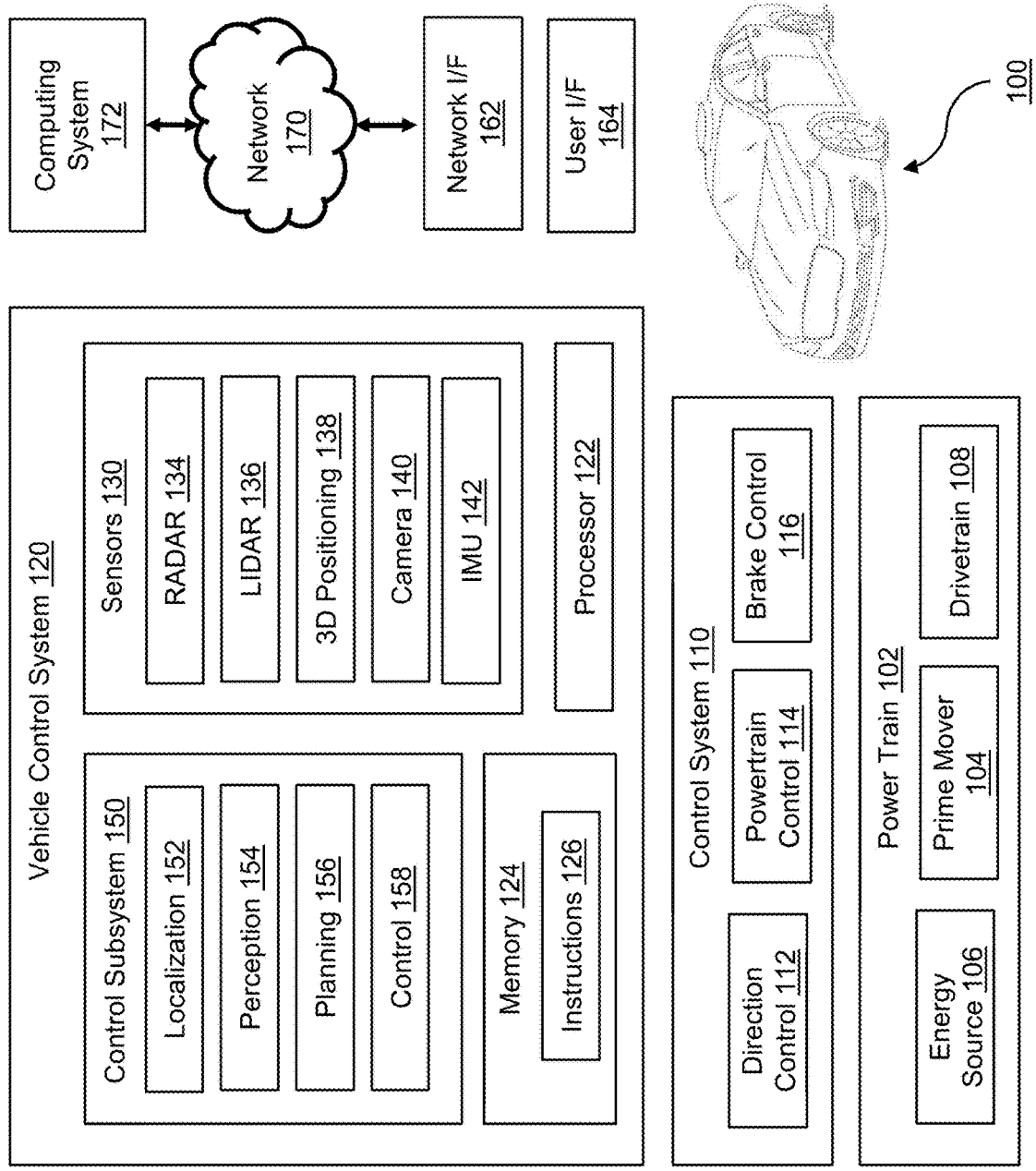
FIG. 1 is a block diagram illustrating an example of a system environment for autonomous vehicles according to some implementations.

Before turning to the figures, which illustrate certain implementations in detail, it should be understood that the present disclosure is not limited to the details or methodology set forth in the description or illustrated in the figures.

It should also be understood that the terminology used herein is for the purpose of description only and should not be regarded as limiting.

According to certain aspects, implementations in the present disclosure relate to techniques for object detection and tracking using a lidar observation model. Lidar sensors can be used to detect lidar data regarding objects such as other vehicles, pedestrians, and bicycles in an environment around the autonomous vehicle. The objects can be tracked over time using the lidar data, such as by generating data structures representing shapes or other spatial data corresponding to the objects. For example, a track can be generated as a data structure that represents a state of an object, such as the locations of a center of the object and extents of the object at a given point in time as well as direction of movement of the object over time. The shape data can indicate one or more extents of object, such as estimated or known physical boundaries of the object, which may be defined in a frame of reference relative to the autonomous vehicle.

Various systems of the autonomous vehicle, such as one or more controllers used to control how the autonomous vehicle moves (e.g., control direction of movement, acceleration, and braking), can rely on the data regarding the objects in the environment. For example, the extents of the object can be used to determine how to move the autonomous vehicle when in proximity to the object. Operations such as nudging, yielding for merging traffic, or braking in response to a lane violation by the object (e.g., by another vehicle) may be performed by a forecasting system (e.g., planning system) that provides commands to the one or more controllers to cause the autonomous vehicle to turn, accelerate, decelerate (e.g., coast by discontinuing acceleration), or brake.

In order to perform such operations effectively, it can be useful for the system to have accurate and precise data regarding object extents, as well as a measure of confidence of the object extents. For example, errors in extent measurements can be greater than 1 meter in some detection systems, which may be too large to rely on in order to perform maneuvers in response to the object extents. Errors in the location of the center of the object as well as the extents of the object may not be uniformly distributed, which may make it difficult to rely on expected shapes of the object to predict the locations of the extents. Some object detection systems using lidar data may not model apparent surfaces that are nearest to the autonomous vehicle effectively. While some systems may use both radar data and lidar data, the radar data may not allow for direct observation of object extents.

Systems and methods in accordance with various aspects of the present disclosure can enable more accurate and precise object detection and tracking, including detection and tracking of object extents. In some implementations, a system includes one or more processors configured to receive lidar data. The one or more processors can determine shape data from the lidar data. The shape data can be indicative of an object. The one or more processors can determine a plurality of extents of the object based on the shape data. The one or more processors can update a state of the object based on the plurality of extents, the state including a boundary of the object. The one or more processors can provide the state of the object to an autonomous vehicle controller to cause the autonomous vehicle controller to control an autonomous vehicle responsive to the state of the object.

For example, the system can operate a lidar observation model that includes a shape model and a measurement model. The shape model can integrate lidar measurements over time into a single, coherent, body-centric frame in an efficient manner. For example, the shape model can maintain a shape data structure corresponding to an object, such as a data structure representing the object using an overhead image or range image. The shape data structure can be used to indicate updates to the shape of the object as perceived via the lidar measurements over time. The shape model can generate belief (e.g., state information) over time as more lidar measurements of the object are received and processed, while mitigating the effects of noise, errors, or outliers based on how the shape model generates the shape data structure and updates the shape data structure as lidar measurements are received over time. The measurement model can take the accumulated shape model as well as a current state (e.g., track), and update the state using the shape model to match the state to the observations of the object represented using the shape model. For example, the measurement model can update a center and multiple extents (e.g., boundaries) of the object as maintained by the state using the shape model; the center and extents may be correlated quantities that can be adjusted together. The measurement model decrease covariances of the extents over time.

The system can enable effective actions in response to the object extents, such as nudging, yielding, and braking. The system can enable more accurate raytracing and association using the extents and the updates to the state of the object that are made using the extents. The system can process the lidar data to determine object shapes and extents without relying on a known or predicted category of the object (e.g., vehicle, pedestrian, bicycle categories), though categorization may be performed using the shape data structure or state of the object. The system can determine spatial regions where lidar measurements are not made or received to make a specific determination that no object is present in such regions, which can increase understanding of the environment around the autonomous vehicle. The system can more effectively determine responses to corner cases, such as when leaving a parking spot, in which the lidar data shape detection and measurement can be used to more effectively determine boundaries of neighboring parked vehicles.

I. System Environment for Autonomous Vehicles

FIG. 1 is a block diagram illustrating an example of a system environment for autonomous vehicles according to some implementations.

Referring to FIG. 1, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

It will be appreciated that the collection of components illustrated in FIG. 1 for the vehicle control system 120 is merely exemplary in nature. Individual sensors may be omitted in some implementations. Additionally or alternatively, in some implementations, multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading. Additional processing of autonomous vehicle data by computing system 172 in accordance with many implementations is described with respect to FIG. 2, FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1 is not intended to limit implementations disclosed herein. Indeed, other alternative hardware and/or software environments may be used without departing from the scope of implementations disclosed herein.

II. Computing Systems for Processing Autonomous Vehicle Data

Figure 2:
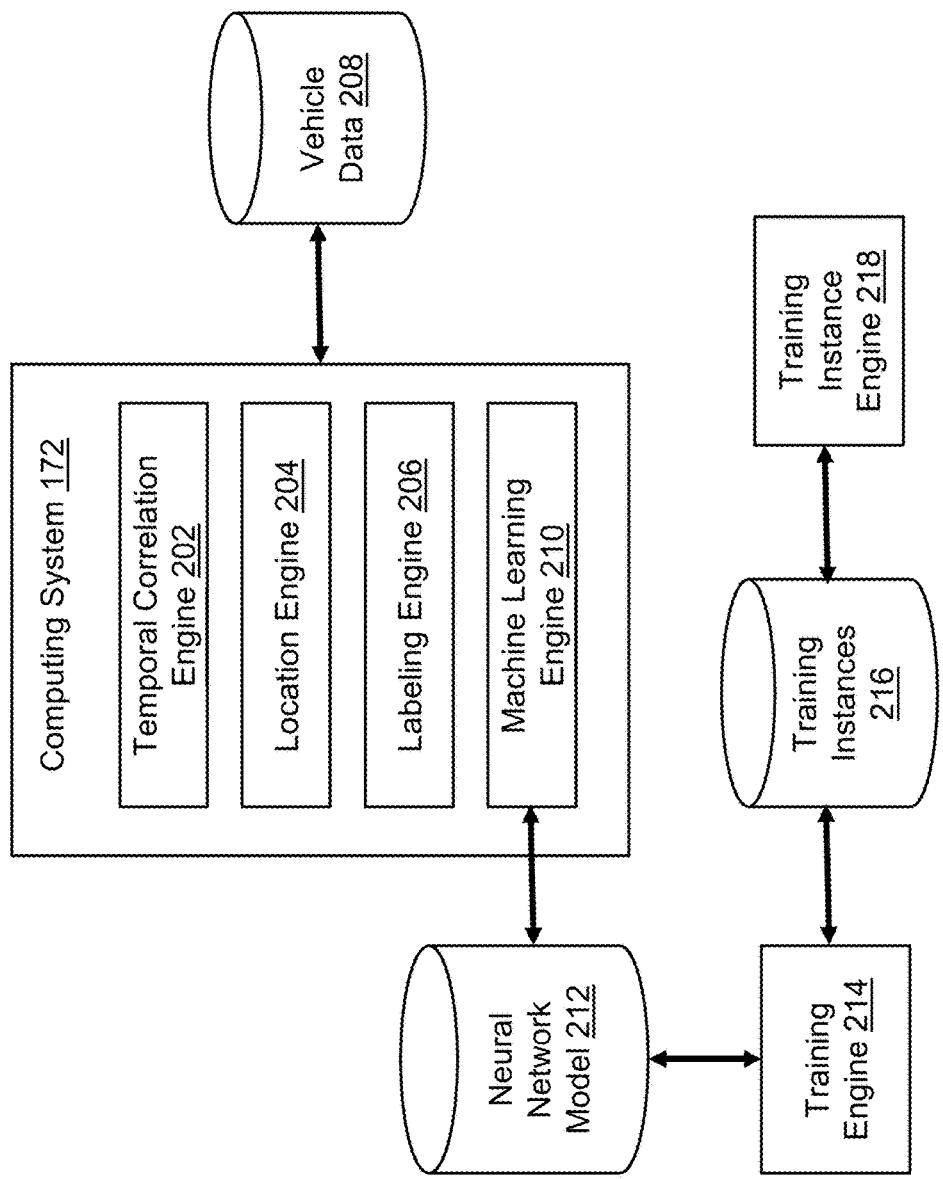
FIG. 2 is a block diagram illustrating an example of a computing system for training a neural network model according to some implementations.

FIG. 2 is a block diagram illustrating an example of a computing system for training a machine learning model such as a neural network model according to some implementations.

The computing system 172 can receive time stamped vehicle observations (e.g., a collection of vehicle data and/or environmental data collected by one or more autonomous vehicle(s) as well as one or more non-autonomous vehicle(s)) via the network 170 (see FIG. 1). In some implementations, computing system 172 may include a temporal correlation engine 202, a location engine 204, a labeling engine 206, a machine learning engine 210, a training engine 214, and a training instance engine 218. The temporal correlation engine 202, location engine 204, labeling engine 206, machine learning engine 210, training engine 214, and training instance engine 218 are example components in which techniques described herein may be implemented and/or with which systems, components, and techniques described herein may interface. The operations performed by one or more engines 202, 204, 206, 210, 214, 218 of FIG. 2 may be distributed across multiple computing systems. In some implementations, one or more aspects of engines 202, 204, 206, 210, 214, 218 may be combined into a single system and/or one or more aspects may be implemented by the computing system 172. For example, in some of those implementations, aspects of the temporal correlation engine 202 may be combined with aspects of the labeling engine 206. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

The computing system 172 can perform a variety of processing on vehicle data 208. In some implementations, the vehicle data 208 includes time stamped autonomous vehicle data (as described herein with respect to FIG. 1). The temporal correlation engine 202 can (if necessary) synchronize time stamps between sets of data collected by separate vehicles collecting data in the same environment. For example, while two vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

The location engine 204 can determine the proximity of vehicles within the environment (often at each time stamp) from the vehicle data 208. In some implementations, the co-presence of vehicles can be determined using one or more proximity sensors within a vehicle. In some implementations, signals from proximity sensors can indicate a wide variety of ranges including: not in range, within one meter, within five meters, within ten meters, within fifty meters, within one hundred meters, within two hundred meters, etc. In some implementations, only vehicle data where vehicles are within a threshold level of proximity may be further processed (e.g., only data from vehicles within a 250 meter range may be additionally processed).

Additionally or alternatively, vehicles can move in and out of a threshold range of proximity as they maneuver in the environment. For example, only data at time stamps where vehicles are in proximity range can be additionally processed. In some implementations, portions of vehicle data where vehicles are not in proximity can be discarded.

The location engine 204 can determine vehicle locations using vehicle data 208. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using lidar data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data (which may be collected using, for example, autonomous vehicle sensor(s) mounted on a non-autonomous vehicle). Data collected by corresponding vehicle lidar units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some implementations, an autonomous vehicle can determine its location on the same map, with respect to the same reference frame, and/or one or more additional methods of determining its location with respect to the same map as the additional vehicle.

The labeling engine 206 can generate labels (in some implementations automatically generate labels) for autonomous vehicle data using vehicle data collected from one or more additional vehicles. In some implementations, the computing system 172 can determine whether two vehicles are co-present in an environment using the location engine 204. In some implementations, the labeling engine 206 can determine instances of autonomous vehicle data which only captures a single additional vehicle co-present in the environment (e.g., when the autonomous vehicle is known to be within a proximity range of an additional vehicle, and only one vehicle is captured in the autonomous vehicle data, generally the additional vehicle will be the vehicle captured in the autonomous vehicle data). In some implementations, the labeling engine 206 can determine instances of autonomous vehicle data which captures additional non-vehicle objects co-present with the current vehicle in the environment. Data collected from the additional vehicle can be mapped to the location of the additional vehicle in the instance of autonomous vehicle data at a common time stamp. For example, a brake light signal of a non-autonomous vehicle (equipped with autonomous vehicle sensors) can be collected via a controller area network (CAN) bus and time stamped by a computing device of the non-autonomous vehicle. A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, the labeling engine 206 can utilize locations of two vehicles determined by location engine 204 (e.g., locations determined using GPS data collected form each vehicle and/or by localizing each vehicle using a common landmark(s) in the environment).

The machine learning engine 210 can be a neural network engine. The machine learning engine 210 can train a neural network model 212. The neural network model 212, in accordance with some implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, the neural network model 212 can represent a variety of machine learning techniques in addition to neural networks such as support vector machines, decision trees, Bayesian networks, other machine learning techniques, and/or combinations of machine learning techniques. Training the neural network model 212 in accordance with some implementations described herein can utilize the machine learning engine 210, training engine 214, and training instance engine 218. Neural network models can be trained for a variety of autonomous vehicle tasks including determining a target autonomous vehicle location, generating one or more signals to control an autonomous vehicle, tracking, detecting, determining, or identifying objects within the environment of an autonomous vehicle, etc. For example, a neural network model can be trained to determine traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

The training instance engine 218 can generate training instances to train the neural network model. A training instance can include, for example, an instance of autonomous vehicle data where the autonomous vehicle can detect an additional vehicle using one or more sensors and a label corresponding to data collected from the additional vehicle. The training engine 214 may apply a training instance as input to neural network model 212. In some implementations, the neural network model 212 can be trained using at least one of supervised learning, unsupervised learning, or semi-supervised learning. Additionally or alternatively, neural network models in accordance with some implementations can be deep learning networks including recurrent neural networks, convolutional neural networks (CNN), networks that are a combination of multiple networks, etc. For example, the training engine 214 can generate a predicted neural network model output by applying training input to the neural network model 212. Additionally or alternatively, the training engine 214 can compare the predicted neural network model output with a neural network model known output from the training instance and, using the comparison, update one or more weights in the neural network model 212. In some implementations, one or more weights may be updated by backpropagating the difference over the entire neural network model 212.

Figure 3:
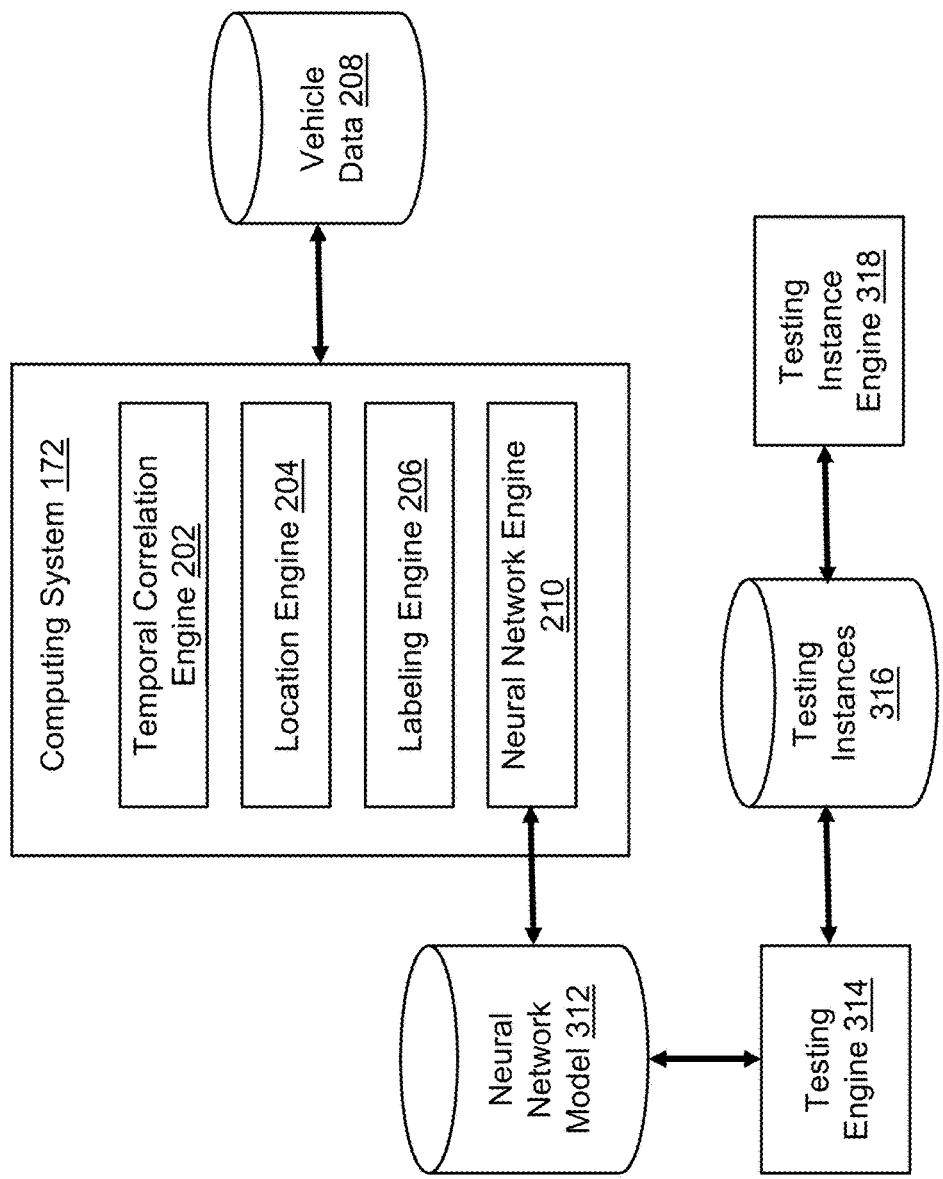
FIG. 3 is a block diagram illustrating an example of a computing system for testing a neural network model according to some implementations.

FIG. 3 is a block diagram illustrating an example of a computing system for testing a trained neural network model according to some implementations. The computing system 172, temporal correlation engine 202, location engine 204, labeling engine 206, and vehicle data 208 are described in the foregoing sections with respect to FIG. 2. The neural network engine 212, testing engine 314, and testing instance engine 318 in accordance with some implementations can be utilized to generate testing instances for autonomous vehicle data including a label corresponding to an additional vehicle or a non-vehicle object present in the autonomous vehicle data, as well as to test a trained (or learned) neural network model 312. In some implementations, the trained neural network model 312 can generate a predicted output for a single autonomous vehicle task. In other implementations, the trained neural network model 312 can generate a predicted output for multiple autonomous vehicle tasks. Testing instance engine 314 can generate testing instances 316 using labeled autonomous vehicle data collected from an autonomous vehicle and an additional vehicle (or a non-vehicle object), performing the specific autonomous vehicle task the neural network model 312 is trained for.

A testing instance, for example, can include an instance of autonomous vehicle data where an additional vehicle (or a non-vehicle object) is detected by one or more sensors of the autonomous vehicle, and a label corresponding to data collected by the additional vehicle. The testing engine 314 can apply a testing instance as input to the neural network model 312. A predicted output generated by applying a testing instance to the neural network model 312 can be compared with a known output for the testing instance (i.e., a label generated by the labeling engine 206) to update an accuracy value (e.g., an accuracy percentage) for the neural network model.

Figure 4:
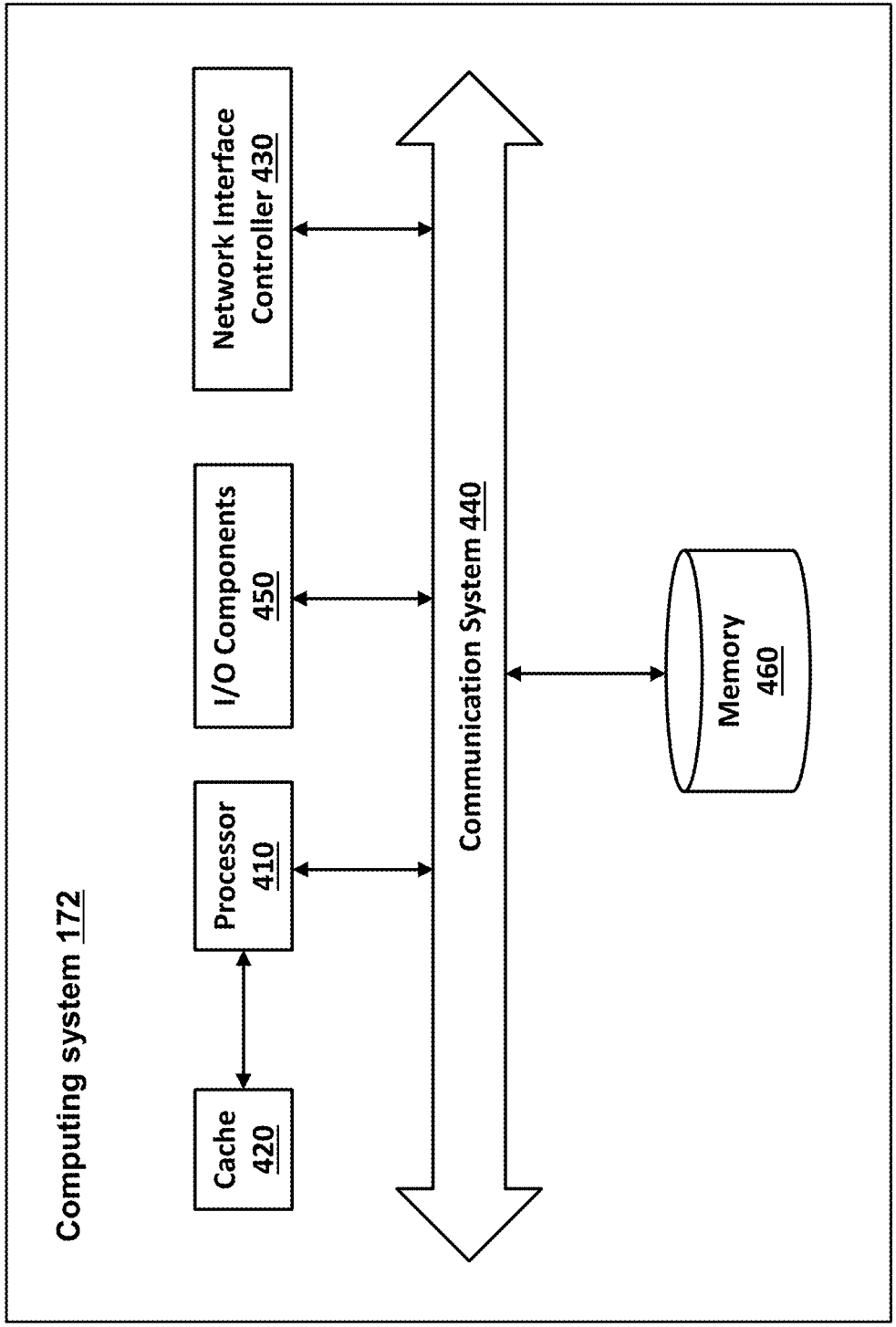
FIG. 4 is a block diagram illustrating an example of a computing system according to some implementations.

FIG. 4 is a block diagram illustrating an example of a computing system according to some implementations.

Referring to FIG. 4, the illustrated example computing system 172 includes one or more processors 410 in communication, via a communication system 440 (e.g., bus), with memory 460, at least one network interface controller 430 with network interface port for connection to a network (not shown), and other components, e.g., an input/output ("I/O") components interface 450 connecting to a display (not illustrated) and an input device (not illustrated). Generally, the processor(s) 410 will execute instructions (or computer programs) received from memory. The processor(s) 410 illustrated incorporate, or are directly connected to, cache memory 420. In some instances, instructions are read from memory 460 into the cache memory 420 and executed by the processor(s) 410 from the cache memory 420.

In more detail, the processor(s) 410 may be any logic circuitry that processes instructions, e.g., instructions fetched from the memory 460 or cache 420. In some implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, a computing system 172 has multiple network interfaces controlled by a single controller 430. In some implementations, a computing system 172 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 172 exchanges data with other computing devices via physical or wireless links through a network interface. The network interface may link directly to another device or to another device via an intermediary device, e.g., a network device such as a hub, a bridge, a switch, or a router, connecting the computing device 172 to a data network such as the Internet.

The computing system 172 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 410 with high precision or complex calculations.

Figure 5:
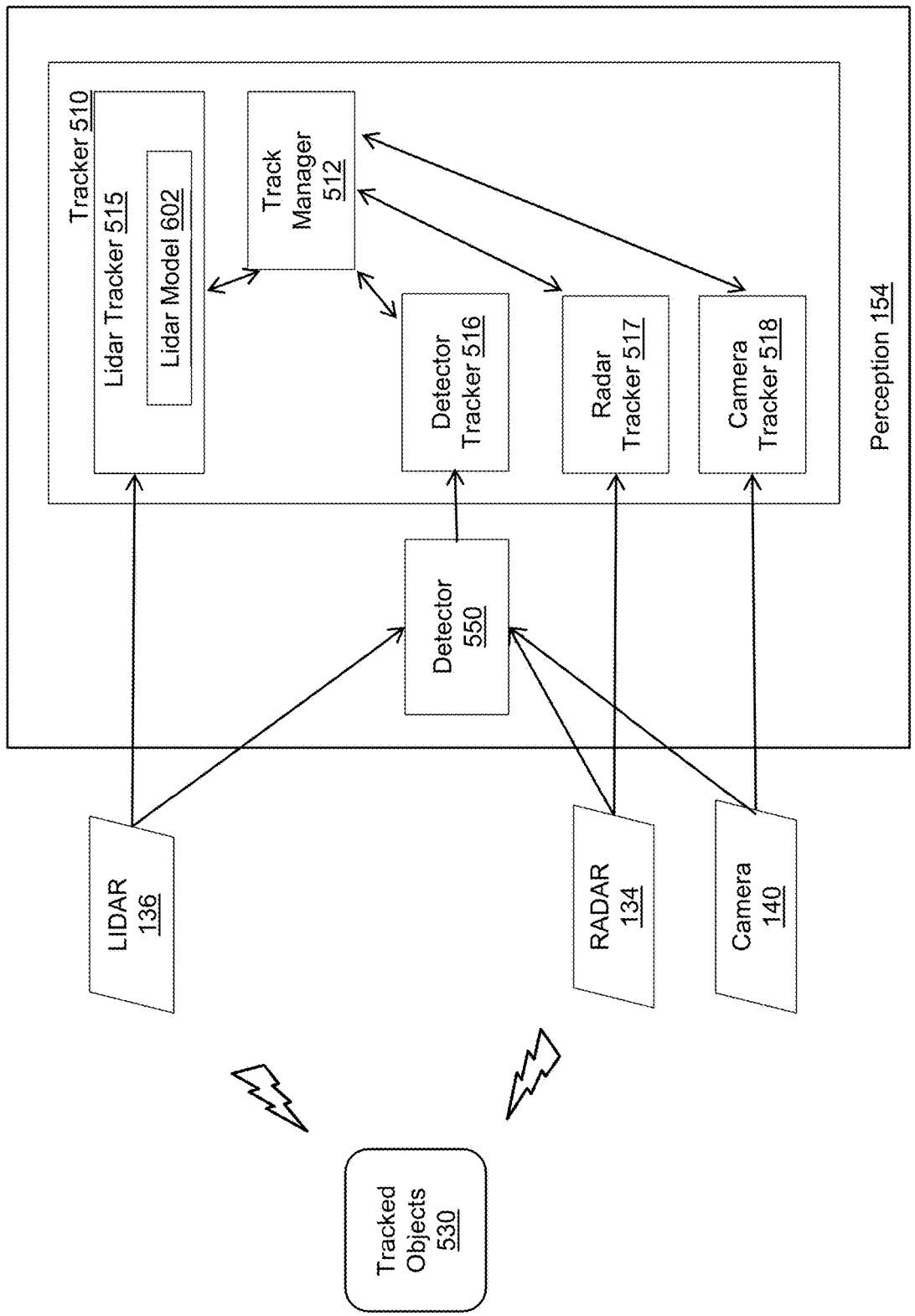
FIG. 5 is a block diagram illustrating an example of a perception system according to some implementations.

III. Systems and Methods for Object Detection and Tracking Using a Lidar Observation Model FIG. 5 is a block diagram illustrating an example of a perception system according to an implementation of the present disclosure.

The perception subsystem 154 can detect, track, determine, and/or identify objects within the environment surrounding the vehicle 100 (see FIG. 1). In some implementations, the perception subsystem 154 may include at least one of a detector 550 (or a plurality of detectors 550) and a tracker 510.

The detector 550 can determine objects within the environment surrounding the vehicle, functioning as a virtual sensor configured to detect new target objects. In some implementations, the detector 550 may receive data from sensors (e.g., lidar data from the lidar sensor 136 or a plurality of lidar sensors 136, radar data from the radar sensor 134 or a plurality of radar sensors 134) and analyze the received sensor data to determine objects. In some implementations, the detector 550 may be one or more detectors corresponding to respective different kinds of sensors, or a single detector receiving data from different kinds of sensors, or multiple detectors each receiving data from different kinds of sensors. In some implementations, the detector 550 may be configured to classify an object into a particular category based on sensor data received from the one or more sensors (e.g., using one or more machine learning models to classify an object into a particular category). In some implementations, the detector 550 may output a detected object to be input to the tracker 510.

The tracker 510 can track objects (e.g., tracked objects 530) within the environment surrounding the vehicle 100. In some implementations, the tracker 510 of the vehicle 100 may be configured to associate consecutive sensor observations (e.g., radar points in a point cloud measured by a radar sensor) of a target object into tracks, such as a data structure representing position data regarding the target object at various points in time indicative of courses or paths that the target object follows. In some implementations, the tracker 510 may include a track manager 512 which updates a track of the target object in accordance with movements of the target object.

In some implementations, the tracker 510 may include a detector tracker 516 which receives a detected object from the detector 550, determines that the detected object is newly detected, and outputs data of a track of the newly detected object (e.g., position and velocity data) to be input to the tracker manager 512. In some implementations, the tracker 510 may include a lidar tracker 515 which converts lidar measurement data (e.g., reflected pulsed laser measured by the lidar sensor 136 or a plurality of lidar sensors 136) to points or a surface in a 3D environment, and output the points or surface to be input to the track manager 512. The lidar tracker 515 can generate tracks of detected objects based on lidar measurement data. The lidar tracker 515 can convert lidar measurement data (e.g., lidar data from the lidar sensor 136 or a plurality of lidar sensors 136) to lidar points in a point cloud, determines tracks of different objects (e.g., present position and velocity of different objects), and outputs lidar points associated with tracks of different objects to be input to the track manager 512. In some implementations, in response to a request for up-to-date lidar measurement data from the track manager 512, the lidar tracker 515 may be configured to output lidar points of up-to-date lidar measurements to be input to the track manager 512.

In some implementations, the tracker 510 may include a radar tracker 517 which converts radar measurement data (e.g., radar data measured from the radar sensor 134 or a plurality of radar sensors 134) to radar points in a point cloud, determines tracks of different objects (e.g., present position and velocity of different objects), and outputs radar points associated with tracks of different objects to be input to the track manager 512. In some implementations, in response to a request for up-to-date radar measurement data from the track manager 512, the radar tracker 517 may be configured to output radar points of up-to-date radar measurements to be input to the track manager 512.

The tracker 510 may include a camera tracker 518 which converts images captured by a camera (e.g., the camera 140 or a plurality of cameras 140) to points or a surface in a 3D environment. The camera tracker 518 can output the points or surface to be input to the track manager 512. The camera tracker 518 can perform similar functions as the lidar tracker 515 or radar tracker 517, such as to provide point cloud data points in response to a request from the track manager 512.

Figure 6:
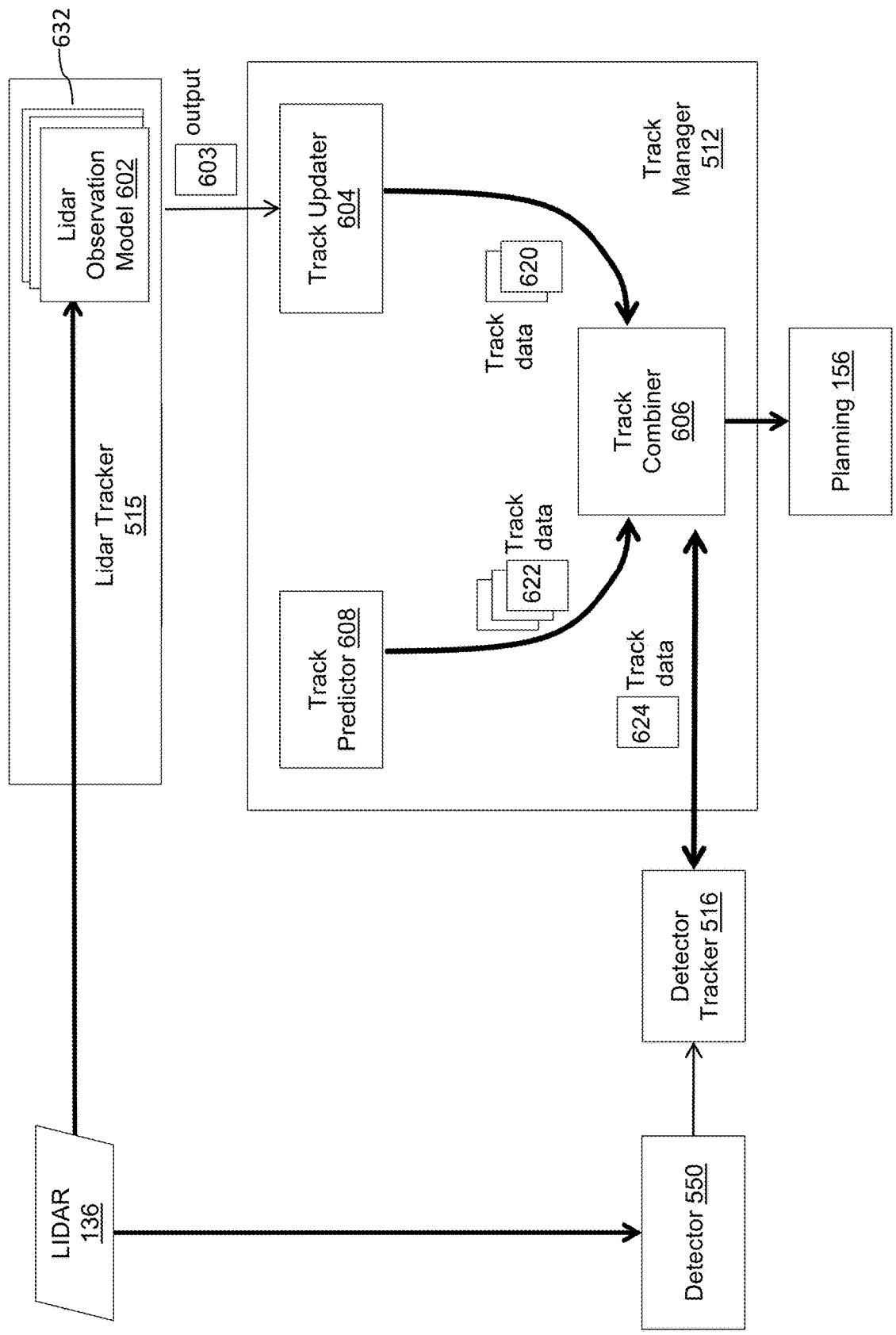
FIG. 6 is a block diagram illustrating an example of a tracker system and a lidar tracker according to some implementations.

FIG. 6 is a block diagram illustrating an example of a track manager 512 according to some implementations.

In some implementations, the track manager 512 may be configured to receive track data of a track of a newly detected target object from various sources. For example, the track manager 512 can receive track data from the radar tracker 517, the detector 550 through the detector tracker 516, the lidar sensor 136, the camera 140, and the radar 134. In some implementations, the track manager 512 can receive measurement data from the lidar tracker 515 (as well as the radar tracker 517, in some implementations), and update the track using a lidar observation model 602 based on (1) prior knowledge about a track (e.g., a prior state of the track or a predicted state based on the prior state) and (2) the track data received from the lidar tracker 515. The measurement data received from the lidar sensor 136 can include lidar points that represent one or more objects in an environment in which the vehicle 100 is located. In some implementations, the lidar sensor 136 can provide lidar points that are already associated or grouped with respect to one or more objects. In some implementations, the lidar sensor 136 can provide lidar points that are not grouped or associated.

Referring to FIG. 6, in some implementations, the track manager 512 may store track data of a plurality of tracks of different objects in a memory, e.g., the memory 124 in FIG. 1. In some implementations, the track manager 512 can store track data in a cloud system and read track data from the cloud system. In particular, track data can be stored and read in real time. A track can include a data structure representing features of an object detected using the detector 550, such as an object detected using lidar measurements provided by the lidar sensor 136. The data structure of the track can include information such as locations of centers and extents of the object at various points in time, as well as confidence scores associated with the locations. The track manager 512 may add new track data to the memory when receiving new track data of a newly detected object from various sources. For example, the track manager 512 can receive track data from the radar tracker 517, the detector 550 through the detector tracker 516, the lidar sensor 136, or the camera 140. The track manager 512 may update an existing track when it is detected that data from a target object is missing from radar measurement data. In some implementations, track data may include position information of a track of a target object at a measurement time, based on which a bounding box of the track can be rendered. In some implementations, the position information of a track of the target object may include position information of one or more corners of a bounding box of the track, such as corners corresponding to intersections of the extents of the object. The position information of a track can include position information of a particular corner that is closest to the vehicle 100. In some implementations, in addition to position and time of the track, track data may include other information such as at least one of position and amplitude of the radar, velocity of the object, Doppler velocity measurements, smoothed position and velocity information, predicted position and velocity information at the time of the next scan, or track firmness (e.g., a measure of detection quality). The lidar tracker 515 may be configured to send a request to the lidar sensor 136 for lidar points of up-to-date lidar measurement data. In response to the request from the lidar tracker 515, the lidar sensor 136 may be configured to send to the lidar tracker 515 lidar points measured at a current measurement time (e.g., measurement time $t_2$). In some implementations, the lidar tracker 515 receives lidar points from the lidar sensor 136 without sending a request to the lidar sensor 136. For example, the lidar tracker 515 can periodically receive lidar points from the lidar sensor 136. As another example, the lidar tracker 515 can receive lidar points from the lidar sensor 136 whenever there are lidar points generated by the lidar sensor 136.

In some implementations, the track manager 512 may include a feature extractor which receives radar points of up-to-date measurement data from the radar tracker 517 and encodes the radar points into feature data. In some implementations, the feature extractor may be configured to send a request for radar points of up-to-date radar measurements. In response to the request from the feature extractor, the radar tracker 517 may be configured to send to the feature extractor, radar points (e.g., radar points 612) which were measured at the current time (hereinafter "a current measurement time $t_2$") and may contain radar points associated with different objects. In some implementations, the feature extractor may be configured to generate, based on the received radar points, feature data to be input to a radar observation model. In some implementations, the feature data may include information on at least one of range, azimuth, range rate, intensity, maximum range, minimum range, maximum range rate, minimum range rate, maximum intensity, or minimum intensity. In some implementations, the feature extractor may encode feature data into feature vectors.

The track manager 512 may include a track predictor 608 which encodes prior knowledge of an existing track (e.g., a prior state of the existing track or a predicted state based on the prior state of the existing track) in order to achieve high accuracy in updating the existing track. In some implementations, the track predictor 608 may be configured to predict, from each existing track of the combined track data (which is not newly received from the detector tracker 516), position of the existing track at the current measurement time $t_2$ at which the lidar points received from the lidar tracker 515 were measured. In some implementations, from the track data of the existing track, the track predictor 608 may be configured to obtain a measurement time (or a most recent update time) of the existing track (hereinafter "previous measurement time $t_1$, where $t_1$ occurs prior to $t_2$), and predicted position of the existing track at the current measurement time $t_2$ by using a motion model based on a difference between the previous measurement time $t_1$ and the current measurement time $t_2$. In some implementations, the motion model is at least one of the constant velocity (CV) model, the constant acceleration (CA) model, the Constant Steering Angle and Velocity (CSAV) model, Constant Curvature and Acceleration (CCA) model, the Constant Turn Rate and Velocity (CTRV) model, or the Constant Turn Rate and Acceleration (CTRA) model, or any other motion models. In some implementations, the track predictor 608 may be configured to generate predicted state data of the track (e.g., predicted state data 609) for use in the lidar observation model 602. In some implementation, the predicted state data may include predicted position information of the existing track at the current measurement time $t_2$, based on which a predicted bounding box of the track can be rendered.

In some implementations, the track predictor 608 may be configured to generate the predicted state data of the track by sampling radar points from among the radar points 612 received by the feature extractor 610 along each side of the predicted bounding box of the track and encoding the radar points along each side of the predicted bounding box into feature vectors. In some implementations, each of feature vectors has a fixed length and indices of a vector represent azimuth angle bins so that each feature vector represents an azimuth field of view (FoV) of the radar.

In some implementations, the track predictor 608 may be configured to generate the predicted state data of the track based on sensor data other than radar measurement data. For example, position information of the target object as the predicted state data of the track of the target object can be generated based on points or a surface in a 3D environment, received from the lidar tracker 515 or the camera tracker 518

(see FIG. 5). With this configuration, where the target object is near the autonomous vehicle, even before the track manager 512 receives up-to-date radar measurement data (e.g., from the radar tracker 517), the track manager 512 can already know or detect that the object is near the autonomous vehicle based on other sensor data (e.g., lidar measurement data).

In some implementations, the track predictor 608 may be configured to generate the predicted state data of the track based on detection data from a detector. For example, the detector 550 (see FIG. 5 and FIG. 6) can not only detect new objects but also detect existing objects. In some implementations, the track predictor 608 may receive track data of existing objects from the detector tracker 516 and generate the predicted state data of the existing based on the received track data. For example, the track predictor 608 may send a request for track data of a particular object with description of category and position of the particular object (e.g., the arrow from the track predictor 608 to the detector tracker 516 in FIG. 6), and in response to the request, the detector tracker 516 may identify and send the particular object to the track predictor 608 (e.g., the arrow from the detector tracker 516 to the track predictor 608 in FIG. 6).

In some implementations, the track predictor 608 may be configured to generate the predicted state data of the track based on previous output data from the lidar observation model 602. For example, a single point representing the track of the target object may be used to generate the predicted state of data of the same track by calculating a predicted single point of the same track using a difference between measurement times.

In some implementations, the track predictor 608 may be configured to generate the predicted state data of the track based on output data from other models of the tracker, if any. In some implementations, the tracker may have a plurality of learned machine learning (ML) models, each receiving different feature data as input and outputting different output vectors. In some implementations, the track predictor 608 may select one of the learned ML models based on properties of the target object (e.g., object category classified by the detector 550) and use the output vectors of the selected model associated with the track to generate the predicted state data of the track. In some implementations, the track predictor 608 may apply radar measurement data associated with the target object at the previous measurement time $t_2$ as training input to a selected one of the learned ML models 632 and include the output from the selected model in the predicted state data 609 of the track.

In some implementations, the track predictor 608 may be configured to generate the predicted state data of the track based on output data from the lidar tracker 515. In some implementations, output data from the lidar tracker 515 may be track data which may include at least one of position and amplitude of the lidar data, velocity of the object, smoothed position and velocity information, predicted position and velocity information at the time of the next scan, or track firmness (e.g., a measure of detection quality). In some implementations, the track predictor 608 may use such track data (as output data from the lidar tracker 515) to generate the predicted state data of the track.

In some implementations, the track manager 512 can implement a Kalman filter to generate and update the state data of the track. The track predictor 608 can generate track data 622. For example, the track predictor 608 can retrieve a first state of the track (e.g., a state corresponding to time $t_1$), and generate track data 622 by providing the first state of the track to a model. The model can be a motion model for the object being tracked (e.g., any of various motion models described herein). The track data 622 can represent a predicted or expected location of the track at time $t_2$. For example, the track data 622 (e.g., of a predicted track of the object) may include predicted position information of the track of the object at the current measurement time $t_2$ (e.g., predicted position, velocity, or acceleration information at the current measurement time $t_2$). In some implementations, the track predictor 608 generates the track data 622 to include a predicted bounding box of the track.

It has been described in the foregoing that various information can be used to generate the predicted state data of the existing track; however, implementations of the present disclosure are not limited thereto and any data available to the track predictor 608 can be used.

The track manager may include a track updater 604. The track updater 604 can receive the output 603 from the lidar tracker 515 (e.g., from lidar observation model 602) and generate track data 620 using the output 603. The track updater 604 can updates an existing track with the output 603, e.g., a single point of measurement data associated with an up-to-date track of the object. For example, in response to receiving the output 603 from the lidar observation model 602, e.g., a center point of lidar measurement data associated with the up-to-date track of the object, the track updater 604 may update the track data of the existing track with the up-to-date position information and the current measurement time $t_2$. In some implementations, the track updater 604 may output the updated track data to be input to the track combiner 606. In some implementations, the track combiner 606 may send the updated track data to the detector tracker 516 so that the detector tracker can identify existing tracks and provide newly detected tracks only to the track combiner 606. The track updater 604 can modify a format of the output 603 to correspond to track data 620, such as for use by track combiner 606 to combine track data 620 with track data 622. In some implementations, the track updater 604 receives the output 603 and provides the output 603 as track data 620. The track updater 604 can generate the track data 620 to represent the lidar measurement data (e.g., represent the lidar measurement data at time $t_2$).

The track combiner 606 can combine the track data 620 (e.g., track data corresponding to measurement data from lidar sensor 136) and the track data 622 (e.g., predicted state of the track), such as to generate track data 624. The track combiner 606 can combine the track data 620 and track data 622 in various manners, such as by using statistical measures assigned to at least one of the track data 620 or the track data 622. The statistical measures can indicate an uncertainty associated with the respective track data; for example, the statistical measures can include a covariance of the respective track data. In some implementations, the track combiner 606 can generate and update track data 624 using information received from detector tracker 516. In some implementations, the track combiner 606 can provide the updated track data 624 to the planning subsystem 156. The planning subsystem 156 can use the updated track data 624 to perform autonomous control of an autonomous vehicle (e.g., the vehicle 100 in FIG. 1), such as to generate a trajectory (which may be provided to vehicle control system 120 to cause the vehicle control system 120 to control operation of direction control 112, powertrain control 114, brake control 116, or various combinations thereof responsive to the trajectory) for the autonomous vehicle using the updated track data 624.

Figure 7:
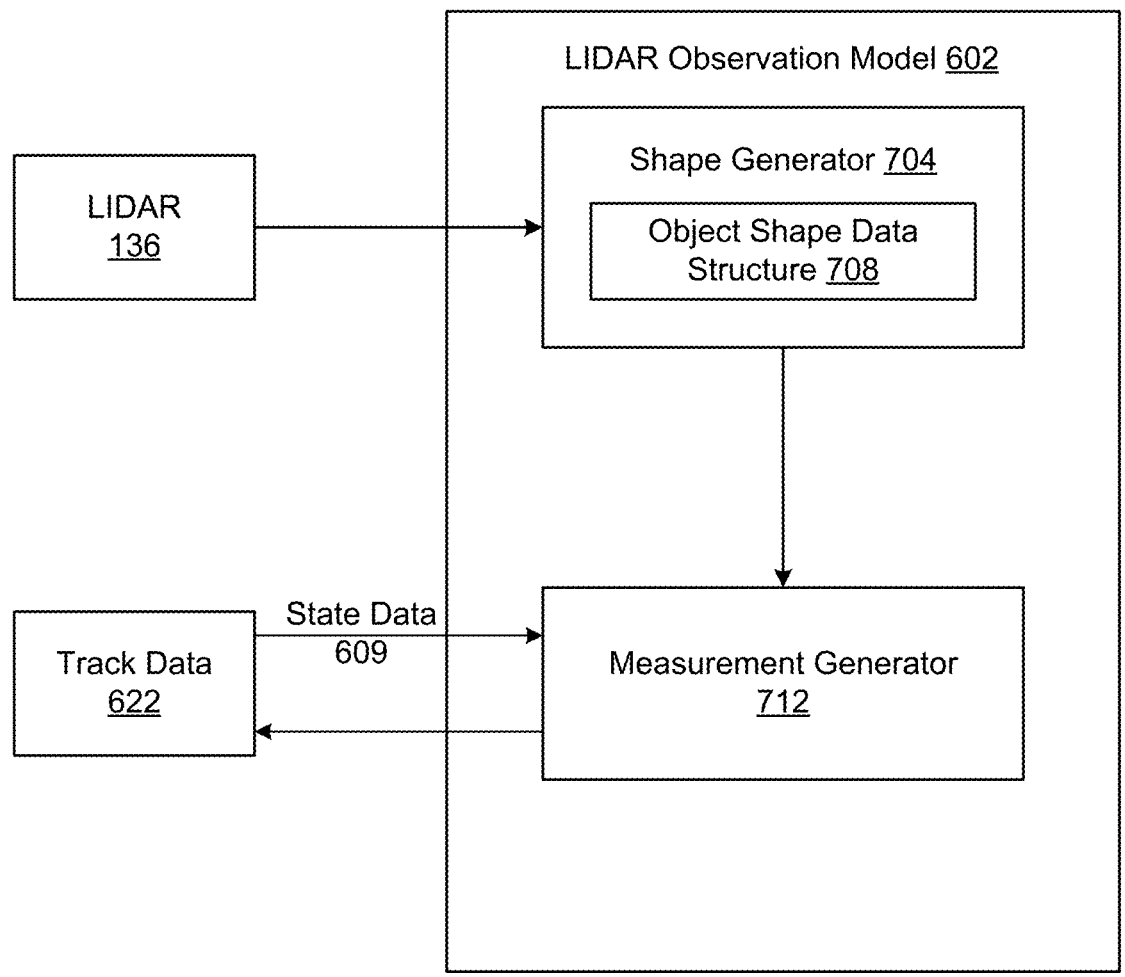
FIG. 7 is a block diagram illustrating an example of a lidar observation model system according to some implementations.

For example, the track manager 512 may include or implement a Kalman filter that generates estimates of a current track at $t_1$ that has an uncertainty based on a predicted state of the track (e.g., track data 622) and a measurement (e.g., measurement corresponding to output 603). In some implementations, responsive to a next measurement (e.g., a measurement corresponding to output 603 at a time $t_1+\Delta t$), the track updater 604 can update an estimate of the track using a weighted average, in which greater weight is assigned to an estimate of the track that has a higher certainty. In some implementations, the Kalman filter is recursive so that estimates of the track may be updated periodically (e.g., every $\Delta t$). In some implementations, the Kalman filter is non-responsive so that the estimates of the track may be updated based on one or more particular features of the algorithm. In some implementations, such as described above with reference to the Kalman filter, the track combiner can combine track data of an existing track (e.g., track data) with new track data of a newly detected object received from the lidar tracker 515. The track combiner 606 may receive new track data including newly detected objects, from various sources (e.g., the detector 550, the lidar sensor 136, the camera 140, or any combination of thereof). In some implementations, the FIG. 7 illustrates an example of the lidar observation model 602 implemented to generate shape data (e.g., object shape data structure 708) of objects and measurements of locations of centers and extents (e.g., estimated or known physical boundaries) of the objects using lidar data measurements received from the lidar sensor 136. The lidar observation model 602 can include a shape generator 704 (e.g., shape model) and a measurement generator 712 (e.g., measurement model). The shape generator 704 can receive lidar data from the lidar sensor 136 (e.g., responsive to processing by the lidar tracker 515).

The shape generator 704 can determine shape data from the lidar data. The shape data can be indicative of an object, such as the tracked objects 530 described with reference to FIG. 5. For example, the shape generator 704 can receive lidar data in a data structure in which the positions are assigned to lidar data. For example, a lidar point extractor (which may be implemented by perception subsystem 154) can process the lidar data to determine a position associated with one or more of the lidar data samples, and assign the position to the one or more lidar data samples. The position may be in an absolute frame of reference, or a relative frame of reference relative to the lidar sensor 136. The lidar point extractor can use a predetermined relationship (e.g., vector) between the lidar sensor 136 and a position of the autonomous vehicle 100 (e.g., of a center, perimeter point, or other point of the autonomous vehicle 100) to assign the position to the lidar data sample in the relative frame of reference. The shape generator 704 may also implement one or more features of the lidar point extractor in order to determine the shape data from the lidar data.

In some implementations, the shape generator 704 assigns a plurality of lidar data samples to an object shape data structure 708. The object shape data structure 708 can represent the shape of the object as indicated by the lidar data. The shape generator 704 can use the positions of one or more of the lidar data samples to generate the object shape data structure 708. For example, the shape generator 704 can generate the object shape data structure 708 as a two-dimensional or three-dimensional data structure (e.g., image) using the position assigned to the one or more lidar data samples. The shape generator 704 can generate the object shape data structure 708 in a spatial frame of reference corresponding to the real-world environment from which the lidar data is detected, such as a Cartesian coordinate system, cylindrical coordinate system, or spherical coordinate system.

The shape generator 704 can generate a plurality of bins corresponding to a spatial region, and assign a particular lidar data sample to a respective bin of the plurality of bins using the position assigned to the particular lidar data sample. For example, the shape generator 704 can determine a bin to assign the particular lidar data sample based on the position assigned to the particular lidar data sample falling within the bin (e.g., each spatial dimension of the position, such as an x-value, y-value, or z-value in a Cartesian coordinate system, is within a corresponding spatial range of the bin). The shape generator 704 can determine a granularity of the plurality of bins, such as a size of one or more bins in one or more dimensions or a number of bins in each dimension, based on factors such as precision and computational capacity or speed. A particular bin can extend between a start value and an end value in each dimension (e.g., a bin in which the position [0.25, 0.25] falls can extend from [0, 0] to [1, 1] in an x-y coordinate space having relatively low granularity, and from [0, 0] to [0.5, 0.5] in an x-y coordinate space having relatively high granularity). In some implementations, the shape generator 704 determines the size of the particular bin based on a desired precision of the shape data corresponding to real-world size dimensions; for example, the shape generator 704 can determine the size of the particular bin to be a size that represents a region one centimeter (cm) across based on a desired one cm precision for the shape data and a predetermined ratio of the size of the bin to real-world distances.

The shape generator 704 can assign the lidar data samples to the respective bins to represent the shape data as at least one of an overhead raster or a range image. For example, the shape generator 704 can represent the shape data as an overhead raster using a spatial region having an x-direction extending in a horizontal direction such as perpendicular to a direction of movement of the autonomous vehicle 100, and a y-direction extending in a depth or range direction along the direction of movement of the autonomous vehicle 100 as described with reference to FIG. 9. The shape generator 704 can represent the shape data as a range image using a spatial region having the x-direction extending in the horizontal direction and a z-direction extending vertically (e.g., perpendicular to a plane in which the direction of movement of the autonomous vehicle 100 lies).

The shape generator 704 can assign any number of lidar data samples to a particular bin based on the positions assigned to the lidar data samples. For example, multiple lidar data samples may correspond to points in space that fall within the same bin. The shape generator 704 can determine a count parameter of the lidar data corresponding to a count of lidar data samples assigned to the bin, such as a mass parameter. As the count of lidar data samples assigned to a particular bin increases, the lidar observation model 602 can determine a greater confidence that the location in real space corresponding to the bin is occupied by the object 530.

In some implementations, the shape generator 704 can uniquely assign a particular lidar data sample to a corresponding bin, such that the particular lidar data sample may only be assigned to a single bin. For example, if the lidar data sample has a position coordinate on an edge between adjacent bins, the shape generator 704 can apply a policy such as to assign the lidar data sample to the bin for which the position coordinate is a lowest or floor value (or a highest or ceiling value). For example, the shape generator 704 can apply a nearest neighbor policy to assign lidar data samples to bins.

The shape generator 704 may perform a scattering operation to assign lidar data samples to bins. For example, the shape generator 704 can identify a first bin in which a particular lidar data sample falls (or an edge or corner at which the particular lidar data sample lies). The shape generator 704 can identify a first corner of the first bin, and identify a plurality of second bins that intersect the first corner, such as by sharing the first corner with the first bin. For example, in a rectangular grid of bins, the second bins can be three bins that share the first corner with the first bin. In some implementations, the shape generator 704 identifies the first corner based on being a corner of the first bin that the particular lidar data sample is closest to. The shape generator 704 can scatter the particular lidar data sample by assigning a fractional weight to the particular lidar data sample for each of the first bin and the plurality of second bins based on a count of the first bin and the plurality of second bins. For example, responsive to identifying four total bins (the first bin and three second bins), the shape generator 704 can assign the particular lidar data sample to each of the four bins with a weight of 0.25 (e.g., one divided by four). As such, when the shape generator 704 determines the count parameter for the first bin and the plurality of second bins, the shape generator 704 can use the weight assigned to the particular lidar data sample assigned to the first bin and the plurality of second bins to determine the count parameter.

As noted above, the plurality of bins may be a two-dimensional representation of the lidar data (e.g., a two-dimensional overhead raster corresponding to a plan view of the environment or a two-dimensional range image corresponding to a front view of the environment). If the lidar data samples are defined in more than two dimensions (e.g., x-, y-, and z-coordinates), the shape generator 704 can assign the lidar data samples to bins based on dimensions of the lidar data samples that match dimensions of the bins. For example, the shape generator 704 can determine to use a plurality of bins corresponding to an overhead raster (e.g., in two-dimensional x-y space), retrieve two lidar data samples having coordinates in x-y-z space of [0, 1, 1] and [0, 1, 2], determine that the x- and y-coordinates of the lidar data samples match the x- and y-dimensions of the plurality of bins, and assign each of the two lidar data samples to a bin in which the matching x-coordinate [0] and y-coordinate [1] falls (e.g., into which any lidar data sample of the form [0, 1, z] falls). As a result of assigning lidar data samples to bins, the shape generator 704 can generate the shape data structure 708 to be a data structure in which the plurality of bins are each assigned a position (or range of positions) and a corresponding count of lidar data samples assigned to the bins.

The measurement generator 712 can determine a plurality of extents of the object 530 based on the shape data. The measurement generator 712 can determine the extents to represent bounds on the shape of the object 530 represented using the plurality of bins. The measurement generator 712 can determine an extent for each side of each direction of the plurality of bins. For example, when the plurality of bins are arranged as an overhead raster, the measurement generator 712 can generate four extents corresponding to left (e.g., an extent parallel to the y-axis and, right, near (e.g., closest to the lidar sensor 136) and far (e.g., furthest from the lidar sensor 136) bounds on the shape of the object 530. The measurement generator 712 can generate the extent to be a boundary between a plurality of first bins of the plurality of bins and a plurality of second bins of the plurality of bins based on a first count of bins assigned to the plurality of first bins and a second count of bins assigned to the plurality of second bins. The measurement generator 712 can generate a particular extent as a pair of positions corresponding to ends of the extent, and may include a vector between the ends of the extent. In some implementations, the measurement generator 712 generates the extents to define a polygon, such as a simple polygon (e.g., non-intersecting edges), such as a rectangle. The ends of adjacent extents may coincide (e.g., the position of an end of a first extent coincides with the position of an end of a second extent adjacent to or extending from the first extent).

In some implementations, the measurement generator 712 applies a minmax function to the shape data to generate the extents. For example, the measurement generator 712 can apply the minmax function to determine an x-value for which each x-value of each bin to which a lidar data sample is assigned is greater than the x-value (e.g., left-side extent), an x-value for which each x-value of each bin to which a lidar data sample is assigned is less than the x-value (e.g., right-side extent), a y-value for each y-value of each bin to which a lidar data sample is assigned is greater than the y-value (e.g., near-side extent), and a y-value for which each y-value of each bin to which a lidar data sample is assigned is less than the y-value (e.g., far-side extent).

In some implementations, the measurement generator 712 determines a confidence score for a particular extent of the object 530. The measurement generator 712 can determine the confidence score for one or more of the extents of the object 530. The measurement generator 712 can determine the confidence score based on a proportion of measurements (e.g., count of lidar data samples out of a total number of lidar data samples) that support the extent. For example, the confidence score can increase as the extent explains more of the lidar data samples represented by the bins that are bounded by the extent. The measurement generator 712 can determine the confidence score to be a value between zero and one corresponding to a ratio of the first count of bins assigned to the plurality of first bins to a sum of the first count of bins and the second count of bins assigned to the plurality of second bins. In some implementations, the measurement generator 712 can determine a confidence score for a particular extent of the object 530 as described in this paragraph.

In some implementations, the measurement generator 712 determines an orientation of the object 530 based on the shape data. For example, the measurement generator 712 can retrieve a template shape of the object 530, compare the template shape to the shape data, and determine an angular difference between the template shape and the shape data to determine the orientation. In some implementations, the measurement generator 712 monitors an orientation of the object 530 based on a change in a state of the object 530 (e.g., using state data 609) as a function of time. The measurement generator 712 can determine the plurality of extents from the shape data based on the orientation of the object 530, such as by aligning the plurality of extents to be parallel to or perpendicular to a vector representing the orientation.

The measurement generator 712 can update a state of the object 530 based at least in part on the extents of the object 530. For example, the measurement generator 712 can combine the extents of the object 530 with state data 609 from the track predictor 608 (e.g., a prior state 609 of the object 530; a predicted state of the object 530). The measurement generator 712 can implement functionality of the track updater 604 and/or track combiner 606 to update the state of the object 530.

The state of the object 530 can include a boundary of the object 530, which may be two-dimensional or three-dimensional. For example, the measurement generator 712 can assign a boundary corresponding to the positions of the extents of the object 530 to the object 530. The measurement generator 712 can retrieve a boundary of the object 530 from the state data 609 (e.g., a previous boundary or predicted boundary), and apply a convex combination to the retrieved boundary using the extents of the object 530 to generate the boundary of the object 530 (e.g., for a current state of the object 530). For example, the measurement generator 712 can apply the convex combination by performing a weighted sum of the boundary retrieved from the state data 609 and the extents of the object 530 determined by the measurement generator 712. The measurement generator 712 can apply a Kalman filter to update the state of the object 530.

The measurement generator 712 can generate the boundary as a bounding box responsive to combining the boundary with the extents, where each extent corresponds to an edge of the bounding box. The measurement generator 712 can provide the boundary as track data 620 for maintaining the track corresponding to the object 530.

The measurement generator 712 can recenter the state of the object 530 (e.g., recenter the track) using the plurality of extents and the state of the object 530 indicated by the state data 609. The measurement generator 712 can determine a center of the object 530 from the state of the object 530, such as by determining an average of the boundary of the state of the object 530. The measurement generator 712 can determine a center of the plurality of extents, such as by determining an average of the plurality of extents. The measurement generator 712 can recenter the state of the object by determining a vector between the center of the object 530 and the center of the plurality of extents, such as by comparing the centers (e.g., subtracting the centers).

The state of the object 530 can be provided to various components of the autonomous vehicle 100, such as the vehicle control system 120 or control system 110. For example, the planning subsystem 156 can use the state of the object 530 to determine whether to perform actions such as turning, acceleration, or braking, and provide control commands to the control system 120 (e.g., to direction control 112, powertrain control 114, or brake control 116) responsive to the determined actions.

In some implementations, the lidar observation model 602 categorizes the object 530 based on at least one of the shape data or the state of the object 530. For example, the lidar observation model 602 can retrieve one or more template shapes corresponding to one or more predetermined categories, compare the template shapes to the shape data or the state of the object 530 (e.g., to the boundary represented by the shape of the object 530), and determine the object 530 to match a predetermined category based on a match score generated according to the comparison.

The lidar observation model 602 can determine that an object is not present in a particular region of space based on the locations of the lidar data samples as assigned to the shape data structure 708. For example, the lidar observation model 602 can process the shape data structure 708 to determine one or more regions in which no lidar data samples have been assigned, and output an indication of the one or more regions. This information can be used by various entities, such as planning 156, to adjust behavior of the autonomous vehicle 100. This information can also be used to generate training samples based on the lidar data. In some implementations, the lidar observation model 602 iteratively parses each bin of the plurality of bins, and determines one or more bins for which no lidar data samples are assigned (e.g., subsequent to assigning each of the lidar data samples). The lidar observation model 602 can indicate which bins do not have lidar data samples assigned or the positions of the respective bins. In some implementations, the lidar observation model 602 uses a minimum threshold size to identify regions (e.g., groups of bins) for which to indicate that no object is present. The minimum threshold size can be greater than one bin. The lidar observation model 602 can identify a bin that does not have any lidar data samples assigned, process one or more adjacent bins selected based on the minimum threshold size, and determine that no object is present in a region corresponding to the bin and the one or more adjacent bins responsive to the bin and the one or more adjacent bins not having lidar data samples assigned.

Figure 8:
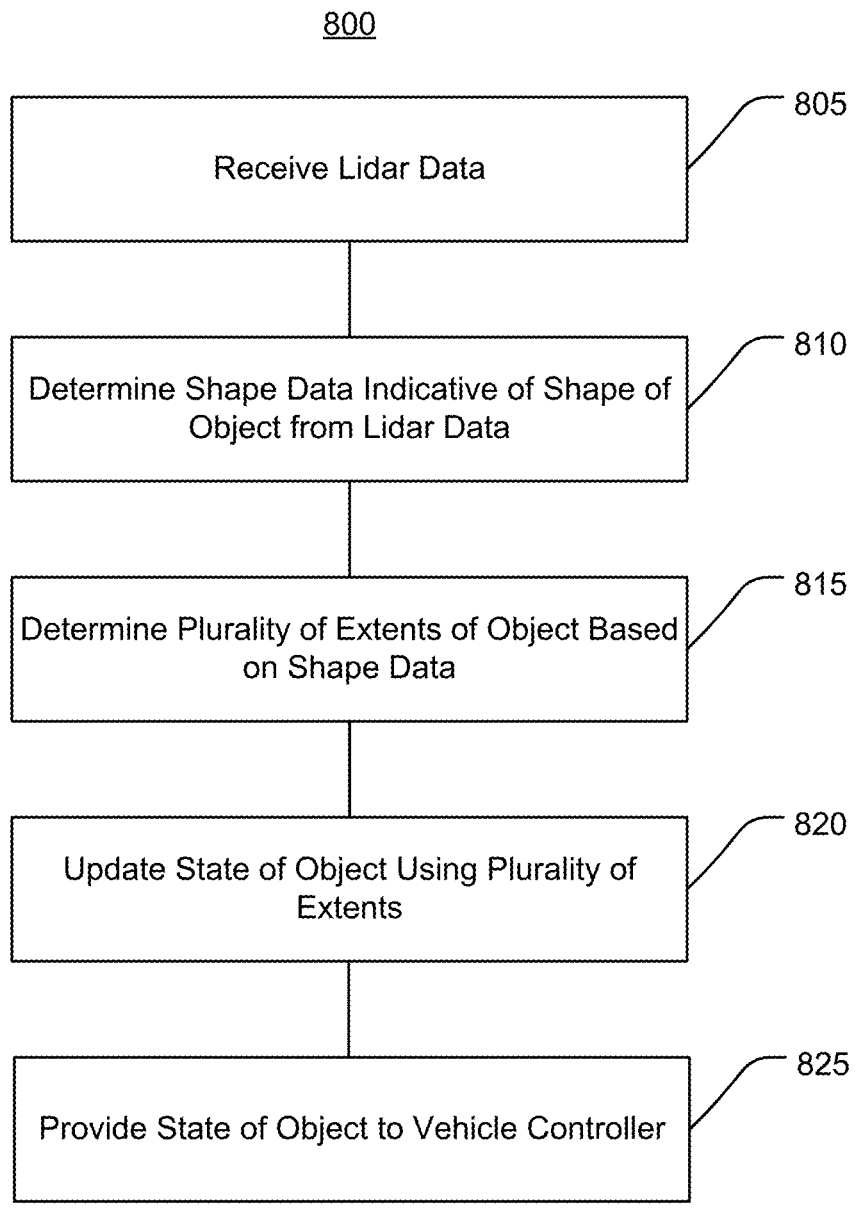
FIG. 8 is a flow diagram illustrating an example of a method for object detection and tracking using a lidar observation model according to some implementations.

FIG. 8 is a flow diagram illustrating an example of a method 800 for object detection and tracking using a lidar observation model according to an implementation of the present disclosure. The method 800 can be performed using various systems described herein, such as the vehicle control system 120, perception 154, and lidar observation model 602, among others.

At 805, lidar data can be received. The lidar data can be received from a lidar sensor that outputs light signals and detects the lidar data responsive to receiving return signals corresponding to the outputted light signals. The lidar data can be received as a batch of multiple lidar data samples. The lidar data can be received responsive to requesting the lidar data, or can be provided periodically by the lidar sensor. A lidar data sample can include a position (e.g., position data in a coordinate system) and a timestamp corresponding to the position.

At 810, shape data indicative of an object can be determined from the lidar data. The shape data can be determined responsive to a particular lidar data sample that is received, or responsive to receiving a set of lidar data samples (e.g., a set of lidar data samples detected in a lidar sweep). The shape data can be determined using the position of the lidar data sample. For example, a shape data structure can be generated, such as an overhead raster (e.g., overhead image) or range image. The shape data structure can include a plurality of bins associated with a range of positions, such as positions in a Cartesian coordinate space. The lidar data samples can be applied to the shape data structure by assigning a particular lidar data sample to a corresponding bin based on the position of the particular lidar data sample and the range of positions associated with the corresponding bin. The shape data structure can be generated and updated responsive to receiving the particular lidar data sample or set of lidar data samples.

At 815, one or more extents of the object can be determined based on the shape data, such as based on the shape data structure in which the lidar data samples are assigned to respective bins based on the positions of the bins. The extents can be generated to represent a boundary of the shape of the object represented using the lidar data. For example, an extent can be generated for each side of each direction of the plurality of bins. The extent can be determined as a line segment such that each bin on a first side of the line segment does not have any lidar data samples assigned and at least one bin adjacent to the extent and on a second side of the line segment opposite the first side has at least one lidar data sample assigned to the at least one bin.

At 820, a state of the object is updated using the plurality of extents. The state of the object can indicate features of the object such as position, extent or boundaries, velocity, or acceleration. For example, the state of the object can include a center of the object and the extents of the object at a given point in time. In some implementations, the state of the object is predicted for a particular point in time using a prior state and a motion model of the object. The state of the object can be updated by combining the plurality of extents determined from the shape data structure with the extents of the state of the object. In some implementations, a confidence score is assigned to a particular extent based on a proportion of lidar data samples that support the extent, and the state of the object is updated based on the confidence score of the extent. For example, the prior or predicted extents and extents determined based on the shape data may be combined such that a relatively higher confidence score corresponds to assigning a relatively higher weight to the extents determined based on the shape data. As such, prior information regarding the object as well as updated information regarding the object determined from the lidar data can be used to update an expected or predicted boundary of the object.

At 825, the state of the object is provided to a vehicle controller. In some implementations, the vehicle controller can be provided a particular portion (e.g., a center or particular corner) of the object and the extents of the object. In some implementations, a vehicle can be controlled responsive to the state of the object. For example, acceleration, braking, or steering can be performed based at least in part on the state of the object.

Figure 9A:
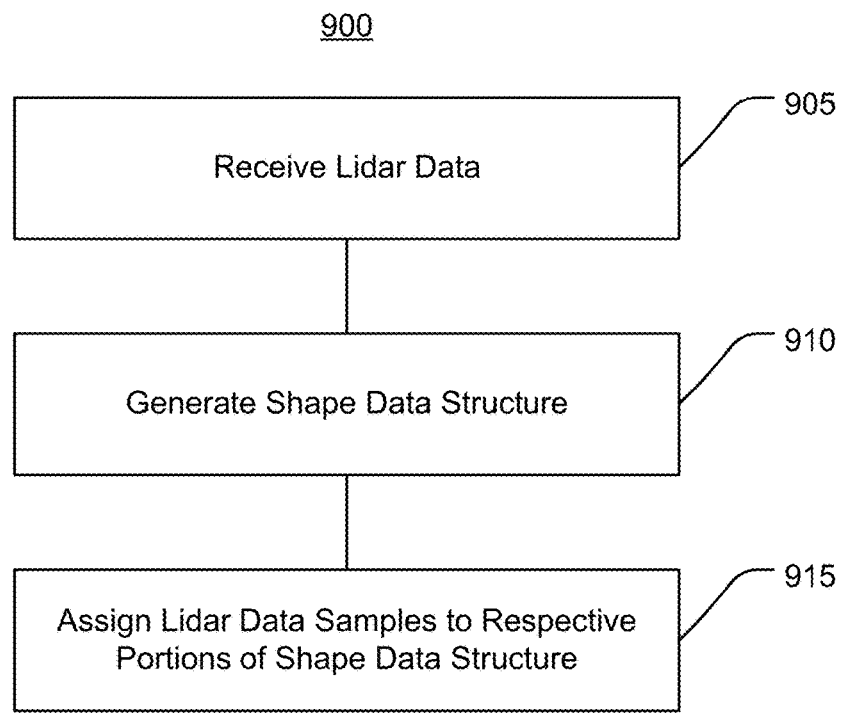
FIG. 9A is a flow diagram illustrating a method for generating shape data using lidar data according to some implementations.
Figure 9B:
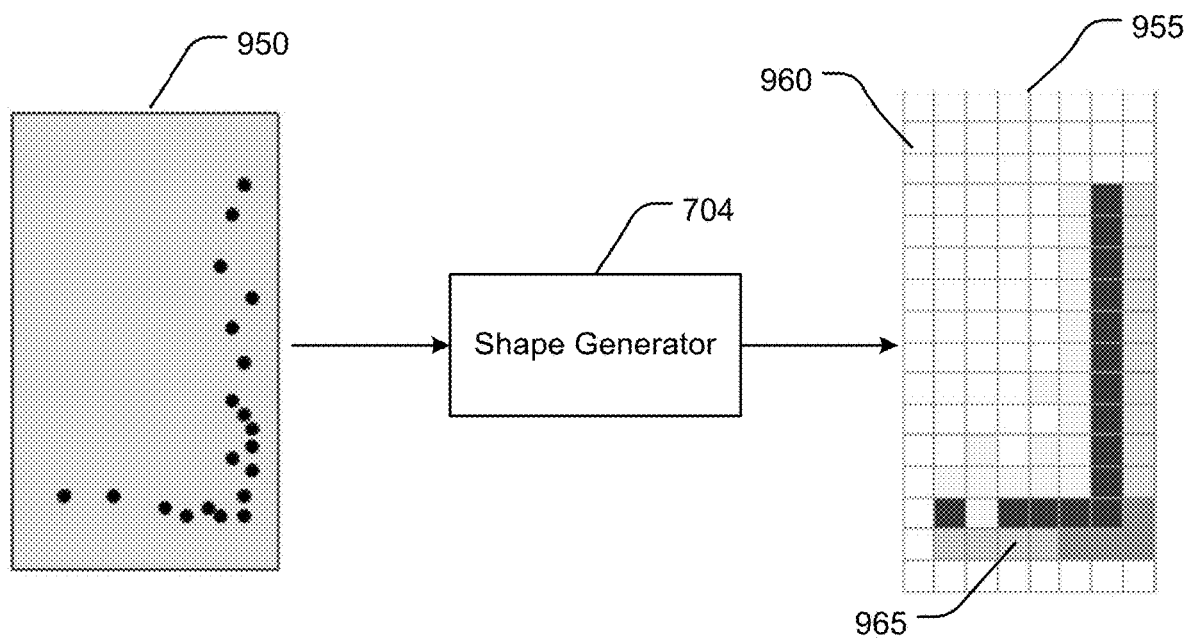
FIG. 9B is a schematic diagram illustrating an example of generating shape data using lidar data according to some implementations.

FIGS. 9A-9B illustrate an example of a method 900 for generating shape data using lidar data according to an implementation of the present disclosure. The method 900 can be performed using various systems described herein, such as the shape generator 704 as illustrated in FIG. 9B. The method 900 or portions thereof can be used to implement the method 800 or portions thereof as described with reference to FIG. 8.

At 905, lidar data can be received. For example, the shape generator 704 can receive lidar data 950 from the lidar sensor 136. The lidar sensor 136 can periodically output the lidar data 950 for usage by the shape generator 704, or the shape generator 704 can periodically sample the lidar sensor 136 at a data sample rate to receive lidar data samples corresponding to the lidar data 950. As illustrated in FIG. 9B, the shape generator 704 can receive lidar data 950 that includes several lidar data samples arranged based on respective positions; for example, at each point in time (e.g., time stamp) at which the lidar data 950 is outputted by the lidar sensor 136 or received by the shape generator 704, the shape generator 704 can receive multiple lidar data samples. The shape generator 704 can receive lidar data 950 at a data rate that is less than a rate at which the lidar sensor 136 detects individual lidar data samples. For example, the lidar sensor 136 may detect lidar data samples at a detection rate on the order of microseconds, while the shape generator 704 receives lidar data 950 at a data rate on the order of milliseconds.

At 910, a shape data structure can be generated. For example, the shape generator 704 can generate a shape data structure to which lidar data samples from the lidar data 950 can be assigned. The shape data structure can be generated in a spatial frame of reference (e.g., Cartesian coordinate system; cylindrical coordinate system) in two dimensions or three dimensions. The shape data structure can be generated based on a desired precision for processing the lidar data 950 corresponding to a real-world precision (e.g., centimeter-scale precision).

In some implementations, as illustrated in FIG. 9B, the shape generator 704 generates a shape data structure 955 as an overhead raster (e.g., overhead image) representative of a plan view of an environment detected using the lidar data 950, such as a plan view of an object detected using the lidar data 950. For example, the shape generator 704 can generate the shape data structure 955 using a plurality of bins 960 arranged in two dimensions (or three dimensions), such as an x-y coordinate system. The shape generator 704 can assign a range of positions to each bin 960 (e.g., the bottom-left bin can be assigned positions [0,0] through [1,1]).

At 915, lidar data samples of the lidar data 950 can be assigned to respective portions of the shape data structure. The lidar data samples can be assigned using position data associated with each lidar data sample and corresponding positions of the shape data structure 955. For example, the shape generator 704 can identify a position associated with a particular lidar data sample, and identify a corresponding bin 960 based on the position to assign the particular lidar data sample to the corresponding bin 960. The shape generator 704 can identify the corresponding bin 960 based on the position associated with the particular lidar data sample mapping to the range of positions assigned to the corresponding bin 960. For example, the shape generator 704 can apply a policy of assigning each lidar data sample to the corresponding bin 960 for which the position value in each dimension is greater than a lower bound of the range of the bin 960 and less than or equal to a higher bound of the range (e.g., assign a lidar data sample having position [0.1, 1] to a bin extending from [0, 0] to [0, 1]; assign a lidar data sample having position [0, 1] to a bin extending from [−1, 0] to [−1, 1]).

As illustrated in FIG. 9B, by assigning lidar data samples to bins 960, each bin may have a count 965 corresponding to a number assigned lidar data samples. The count 965 may be indicative of a likelihood or confidence that the position corresponding to the bin 960 is occupied by mass (e.g., occupied by an object). On the other hand, if a particular bin 960 or group of adjacent bins 960 do not have any lidar data samples assigned, the shape generator 704 can determine that no object is present at the position corresponding to the bin 960 or group of adjacent bins 960.

Figure 10A:
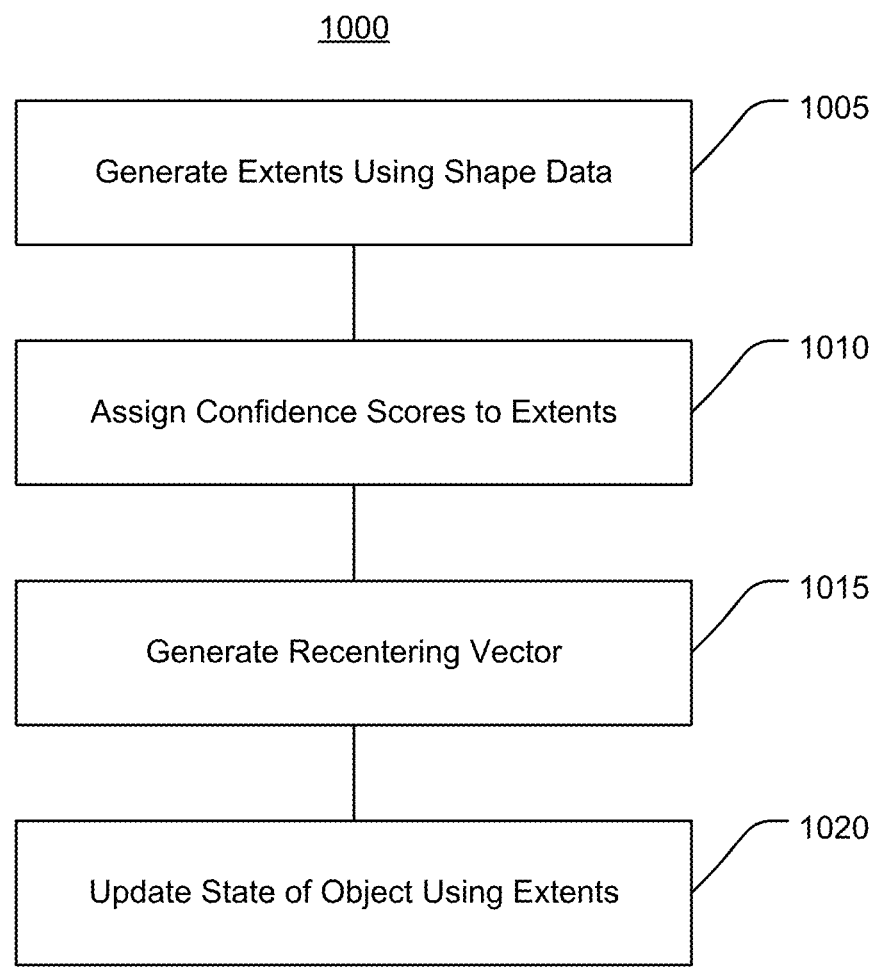
FIG. 10A is a flow diagram illustrating an example of a method for updating a state of an object using shape data according to some implementations.
Figure 10B:
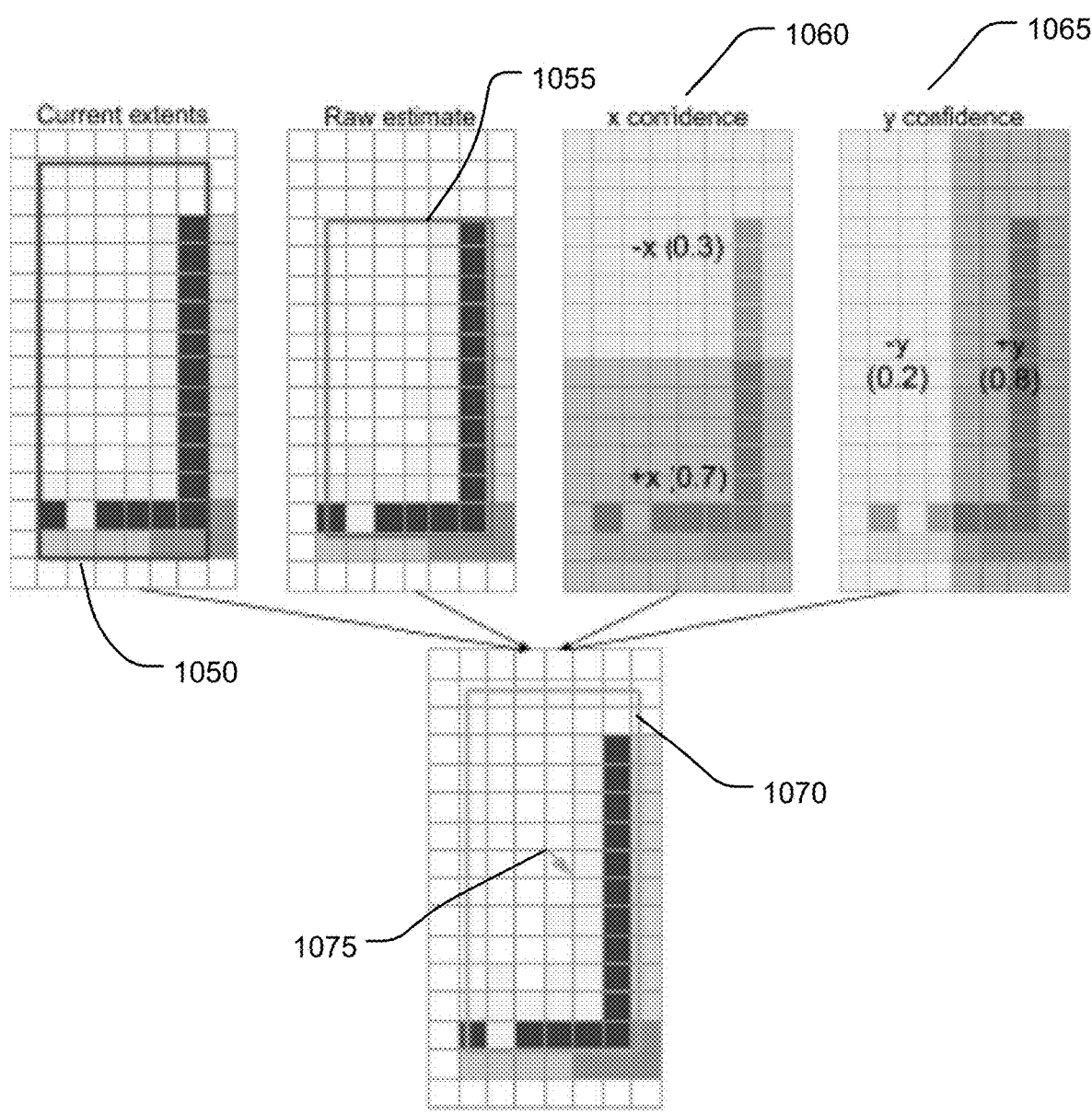
FIG. 10B is a schematic diagram illustrating an example of generating an object measurement using shape data according to some implementations.

FIGS. 10A-10B illustrate an example of a method 1000 for updating a state of an object using shape data according to an implementation of the present disclosure. The method 1000 can be performed using various systems described herein, such as the measurement generator 712. The method 1000 or portions thereof can be used to implement the method 800 or portions thereof as described with reference to FIG. 8. The method 1000 can be performed responsive to generation of shape data, such as by updating the state of the object responsive to each instance in which an overhead raster or range image is generated based on lidar data samples.

At 1005, extents 1055 of an object can be generated using shape data indicative of the object. The shape data can include a spatial representation of the object, such as a spatial representation generated by assigning lidar data samples to bins or cells of a shape data structure using positions of the lidar data samples. The extents 1055 of the object can correspond to a bounding box of the object, such that the object may be expected to be located within the extents 1055 and not outside of the extents. The extents 1055 can be generate as a pair of points in space, such that the extent 1055 can be a line segment between the pair of points. In some implementations, the extents 1055 are generated by applying a minmax function to the shape data, such as to determine locations for the extents 1055 such that the lidar data samples as indicated by the shape data are bounded by the extents 1055.

At 1010, a confidence score 1060, 1065 is assigned to one or more extents. The confidence score can correspond to a ratio of the first count of bins assigned to the plurality of first bins to a sum of the first count of bins and the second count of bins assigned to the plurality of second bins. The confidence score can indicate a proportion of lidar data samples that support the location of the extent. As illustrated in FIG. 10B, confidence scores 1060 can be assigned in a horizontal direction (e.g., parallel to the x-axis) and confidence scores 1065 can be assigned in a vertical direction (e.g., parallel to the y-axis).

At 1015, a recentering vector 1075 is generated. The recentering 1075 vector can indicate how to update a state of the object (e.g., prior state or predicted state, which may include extents 1050) using the extents 1055 determined using the shape data. In some implementations, the recentering vector 1075 is based on a center of the object retrieved from the state of the object and a new center of the object as indicated by the extents 1055. For example, a new center of the object can be determined as a geometric center of the extents 1055. The recentering vector 1075 can be determined based on a difference between the new center and the center retrieved from the state of the object. In some implementations, the difference is weighted by the confidence scores 1060, 1065 assigned to one or more of the extents 1055.

At 1020, the state of the object (e.g., a track corresponding to the object) is updated using the extents 1055. Updating the state of the object can include applying the recentering vector 1075 to the center of the state, which can result in an updated center. Updating the state of the object can include combining the extents 1055 generated using the shape data with extents 1050 retrieved from the state of the object. For example, a convex combination can be used to combine the extents 1050 from the state of the object and the extents 1055 generated using the shape data. A Kalman filter can be applied to the extents 1050 from the state of the object using the extents 1055 generated using the shape data and the confidence scores 1060, 1065 of the extents 1055 to update the state of the object.

Figure 11:
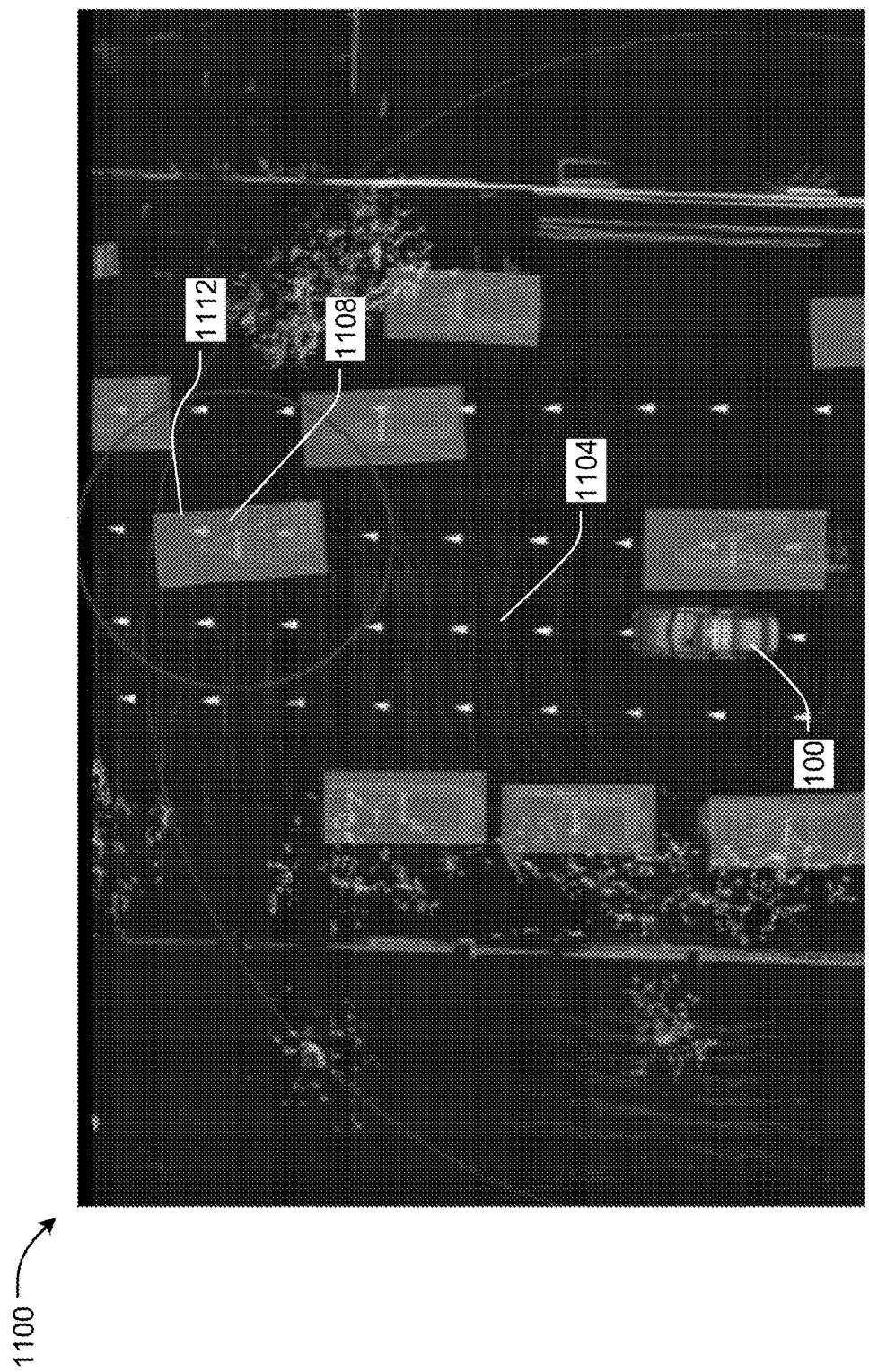
FIG. 11 is a schematic diagram illustrating an example of an autonomous vehicle using object detection and tracking data according to some implementations.

FIG. 11 illustrates an example in which a lidar observation model can be used to detect and track objects and control operation of an autonomous vehicle 100. As illustrated in FIG. 11, the autonomous vehicle 100 can be moving in an environment 1100 in which various other objects, such as vehicles 1108, are present. The autonomous vehicle 100 can be moving on a road divided into lanes 1104. It may be expected that each vehicle 100, 1108 maintains a path of travel within a respective lane 1104 unless a decision is made to leave the lane 1104, such as to change lanes or turn out of the road. The autonomous vehicle 100 can maintain a data structure, such as a track, indicating a state of each vehicle 1108, and update the track as sensor data is received.

For example, autonomous vehicle 100 can use lidar sensors (e.g., lidar sensors 136) to detect lidar data regarding the environment 1100, such as lidar data corresponding to reflections from the vehicle 1108 that can indicate the positions of points on the vehicle 1108. Using the lidar sensors, the autonomous vehicle 100 can receive the lidar data, and generate shape data indicative of the vehicle 1108 using the lidar data, such by using positions of lidar data samples of the lidar data sample to assign the lidar data samples to bins of an overhead image (e.g., an image in a frame of reference analogous to that of FIG. 11) or range image. The autonomous vehicle 100 can generate a plurality of extents based on the shape data, such as to determine a bounding box of the vehicle 1108. The autonomous vehicle 100 can update the track using the plurality of extents, enabling the autonomous vehicle 100 to increase the precision and accuracy of the track over time as additional lidar data measurements are received (even as the vehicle 1108 moves over the course of time).

As illustrated in FIG. 11, the boundary 1112 of the vehicle 1108 (e.g., a boundary corresponding to the extents of the vehicle 1108 determined by updating the state of the vehicle 1108 using the shape data) is at least partially located in the lane 1104 in which the autonomous vehicle 100 is moving. A planning system or other control module of the autonomous vehicle 100 can detect that the boundary 1112 is at least partially located in the lane 1104 (e.g., in a path of travel of the autonomous vehicle 100) and determine if a response maneuver should be performed, such as a brake jab, responsive to the location of the boundary 1112. By generating an accurate representation of the boundary 1112 using various aspects of the present solution, the autonomous vehicle 100 can more effectively respond to the presence and movements of other objects, such as vehicles 1108, in the environment 1100.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary implementation, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or implementation, and references to "an implementation," "some implementations," "one implementation" or the like are not necessarily mutually exclusive and are intended to indicate that a particular feature, structure, or characteristic described in connection with the implementation can be included in at least one implementation or implementation. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary implementations, and that such variations are intended to be encompassed by the present disclosure.

What is claimed is:

1. A method for detecting and tracking objects using lidar, comprising:
    receiving lidar data comprising a plurality of lidar data samples;
    determining shape data from the lidar data, the shape data indicative of an object, by assigning a particular lidar data sample of the lidar data to a particular bin of a plurality of bins based on a position of the particular lidar data sample, the plurality of bins arranged in a first direction and a second direction, the first direction along a direction of movement of an autonomous vehicle, the second direction perpendicular to the first direction;
    determining a plurality of extents of the object based on the shape data by identifying a plurality of first bins of the plurality of bins and a plurality of second bins of the plurality of bins as corresponding to a particular extent of the plurality of extents, the identifying based on a first count of the plurality of lidar data samples assigned to the plurality of first bins and a second count of the plurality of lidar data samples assigned to the plurality of second bins;
    updating a state of the object based at least in part on the plurality of extents, the state including a boundary of the object; and
    controlling an autonomous vehicle responsive to the state of the object.

2. The method of claim 1, further comprising generating the plurality of bins to represent the shape data as an overhead raster.

3. The method of claim 1, wherein updating the state of the object comprises:
    determining a confidence score of the particular extent based on the first count and the second count; and
    combining the plurality of extents and the state of the object based on the confidence score.

4. The method of claim 1, further comprising:
    determining, by the one or more processors, an orientation of the object based on the lidar data; and
    determining, by the one or more processors, the plurality of extents based on the orientation.

5. The method of claim 1, wherein the state of the object comprises a plurality of prior extents of the object based on prior lidar data.

6. The method of claim 1, wherein the lidar data is received from one or more lidar sensors coupled with the autonomous vehicle.

7. The method of claim 1, further comprising:
    assigning the object to a selected category of a plurality of categories based on at least one of the shape data or the state of the object.

8. The method of claim 1, wherein the lidar data is first lidar data, the method further comprising:
    receiving second lidar data; and
    updating the state of the object responsive to the second lidar data.

9. The method of claim 1, further comprising determining a center of the object based on the shape data.

10. A system for detecting and tracking objects using lidar, comprising:
    one or more processors configured to:
        receive lidar data comprising a plurality of lidar data samples;
        determine shape data from the lidar data, the shape data indicative of an object, by assigning a particular lidar data sample of the plurality of lidar data samples to a particular bin of a plurality of bins using position data corresponding to the particular lidar data sample, the plurality of bins arranged in a plurality of directions;
        determine a plurality of extents of the object based on the shape data by identifying a plurality of first bins of the plurality of bins and a plurality of second bins of the plurality of bins as corresponding to a particular extent of the plurality of extents, the identifying based on a first count of the plurality of first bins and a second count of the plurality of second bins;
        update a state of the object based on the plurality of extents, the state including a boundary of the object; and
        control an autonomous vehicle responsive to the state of the object.

11. The system of claim 10, wherein the one or more processors is further configured to generate the plurality of bins to represent the shape data as at least one of an overhead raster or a range image.

12. The system of claim 11, wherein the one or more processors are configured to represent the shape data as the range image by arranging the plurality of bins in a first direction and a second direction, the first direction perpendicular to a direction of movement of the autonomous vehicle and in a plane in which the direction of movement lies, the second direction perpendicular to the plane.

13. The system of claim 10, wherein in updating the state of the object, the one or more processors are further configured to:
    determine a confidence score of the particular extent based on the first count and the second count; and
    combine the plurality of extents and the state of the object based on the confidence score.

14. The system of claim 10, wherein the one or more processors are further configured to:
    determine an orientation of the object based on the lidar data; and
    determine the plurality of extents based on the orientation.

15. The system of claim 10, wherein the state of the object comprises a plurality of prior extents of the object based on prior lidar data.

16. The system of claim 10, wherein the one or more processors are further configured to assign the object to a selected category of a plurality of categories based on at least one of the shape data or the state of the object.

17. The system of claim 10, wherein the one or more processors are configured to update a track of the object based on the state of the object.

18. A non-transitory computer-readable medium comprising instructions that, in response to execution of the instructions by one or more processors, cause one or more processors to perform the following operations:
    receiving lidar data comprising a plurality of lidar data samples;
    determining shape data from the lidar data, the shape data indicative of an object, by assigning a particular lidar data sample of the plurality of lidar data samples to a particular bin of a plurality of bins using position data corresponding to the particular lidar data sample, the plurality of bins arranged in a plurality of directions;

determining a plurality of extents of the object based on the shape data by identifying a plurality of first bins of the plurality of bins and a plurality of second bins of the plurality of bins as corresponding to a particular extent of the plurality of extents, the identifying based on a first count of the plurality of first bins and a second count of the plurality of second bins;

updating a state of the object based on the plurality of extents, the state including a boundary of the object; and controlling an autonomous vehicle responsive to the state of the object.

19. The non-transitory computer-readable medium of claim 18, further comprising instructions that cause the one or more processors to perform the following operations:

determining a confidence score of the particular extent based on the first count of bins and the second count of bins; and combining the plurality of extents and the state of the object based on the confidence score.

\* \* \* \* \*